(12) United States Patent
Danziger et al.

(10) Patent No.: US 12,326,589 B2
(45) Date of Patent: Jun. 10, 2025

(54) LIGHT-GUIDE OPTICAL ELEMENT WITH MULTIPLE-AXIS INTERNAL APERTURE EXPANSION

(71) Applicant: Lumus Ltd., Ness Ziona (IL)

(72) Inventors: Yochay Danziger, Kfar Vradim (IL); Elad Sharlin, Mishmar David (IL)

(73) Assignee: LUMUS LTD., Ness Ziona (IL)

( * ) Notice: Subject to any disclaimer, the term of this patent is extended or adjusted under 35 U.S.C. 154(b) by 0 days.

(21) Appl. No.: 18/675,666

(22) Filed: May 28, 2024

(65) Prior Publication Data

US 2024/0310569 A1  Sep. 19, 2024

Related U.S. Application Data

(63) Continuation of application No. 17/840,802, filed on Jun. 15, 2022, now Pat. No. 11,994,705, which is a continuation of application No. 16/963,535, filed as application No. PCT/IL2018/050701 on Jun. 26, 2018, now Pat. No. 11,385,393, which is a
(Continued)

(51) Int. Cl.
| | |
|---|---|
| G02B 27/02 | (2006.01) |
| F21V 8/00 | (2006.01) |
| G02B 27/12 | (2006.01) |
| G02B 27/14 | (2006.01) |
| G02B 27/28 | (2006.01) |
| G02F 1/1335 | (2006.01) |

(Continued)

(52) U.S. Cl.
CPC ......... *G02B 6/0031* (2013.01); *G02B 6/0016* (2013.01); *G02B 6/002* (2013.01); *G02B 27/283* (2013.01)

(58) Field of Classification Search
CPC ........ G02B 27/0172; G02B 6/10; G02B 6/26; G02B 6/0018; G02B 6/2938; G02B 6/0028; G02B 6/0076; G02B 6/0088; G02B 6/34; G02B 6/0075; G02B 27/0101; G02B 27/0149; G02B 27/145; G02B 27/0103; G02B 27/01; G02B 25/02; G02B 27/143; G02B 27/126; G02B 5/04; G02B 27/283; G09F 19/18; H04N 5/74; H04N 5/7491; A61B 3/103; A61B 3/14; A61B 3/113; A61B 3/1225; G03H 1/0408; G03B 21/00; G03B 21/143; G09G 3/003; B43L 13/18
USPC ............ 359/798, 13–14, 630–636, 640, 831; 345/7–9; 349/11; 351/200, 205–206, 351/210, 221
See application file for complete search history.

(56) References Cited

U.S. PATENT DOCUMENTS

| | | | |
|---|---|---|---|
| 2010/0111472 A1* | 5/2010 | DeJong | G02B 27/0081 385/31 |
| 2011/0011449 A1* | 1/2011 | Morgan | H01L 31/0547 136/255 |
| 2017/0045743 A1* | 2/2017 | Dobschal | G02B 6/00 |

FOREIGN PATENT DOCUMENTS

WO   WO-2015158828 A1 * 10/2015 ........... G02B 27/017

\* cited by examiner

*Primary Examiner* — Dawayne Pinkney
(74) *Attorney, Agent, or Firm* — Rivka Friedman

(57) ABSTRACT

An optical device includes a lightguide having a first pair of external surfaces parallel to each other, and at least two sets of facets. Each of the sets including a plurality of partially reflecting facets parallel to each other, and between the first pair of external surfaces. In each of the sets of facets, the respective facets are at an oblique angle relative to the first pair of external surfaces, and at a non-parallel angle relative
(Continued)

to another of the sets of facets. The optical device is particularly suited for optical aperture expansion.

17 Claims, 20 Drawing Sheets

Related U.S. Application Data continuation of application No. 15/978,139, filed on May 13, 2018, now Pat. No. 10,551,544.

(60) Provisional application No. 62/645,222, filed on Mar. 20, 2018, provisional application No. 62/633,095, filed on Feb. 21, 2018, provisional application No. 62/619,830, filed on Jan. 21, 2018.

(51) Int. Cl.
*G03H 1/00* (2006.01)
*G09G 5/00* (2006.01)

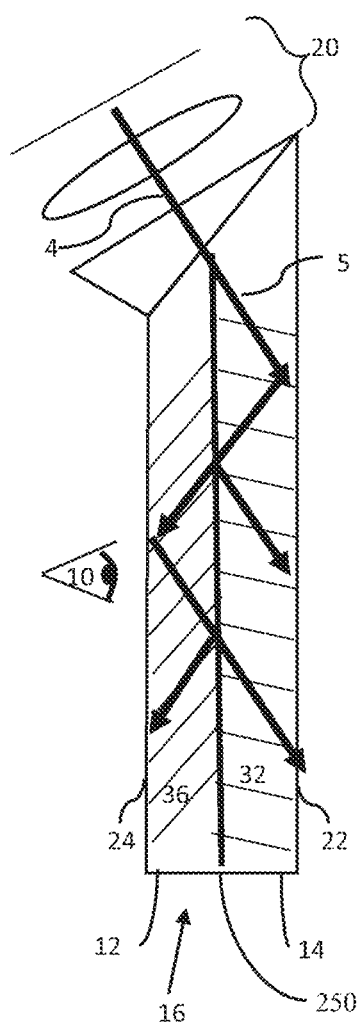 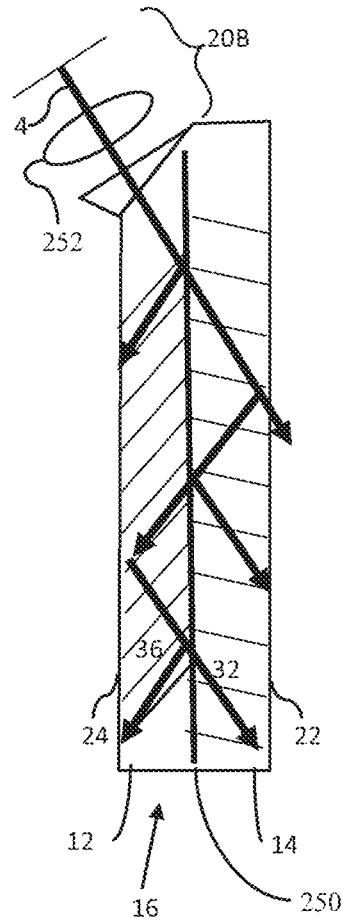 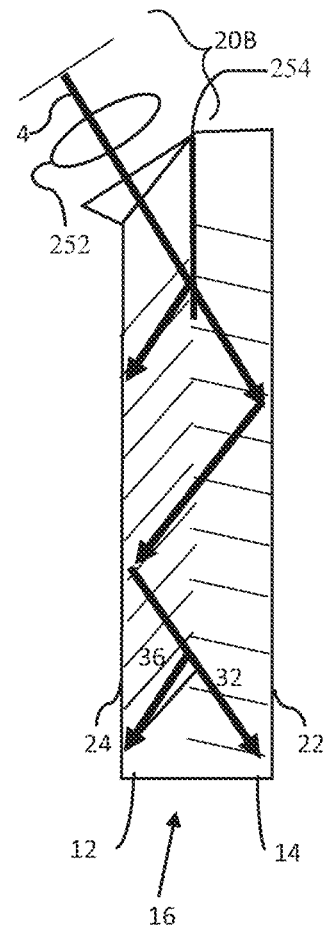
FIG. 22A  FIG. 22B  FIG. 22C
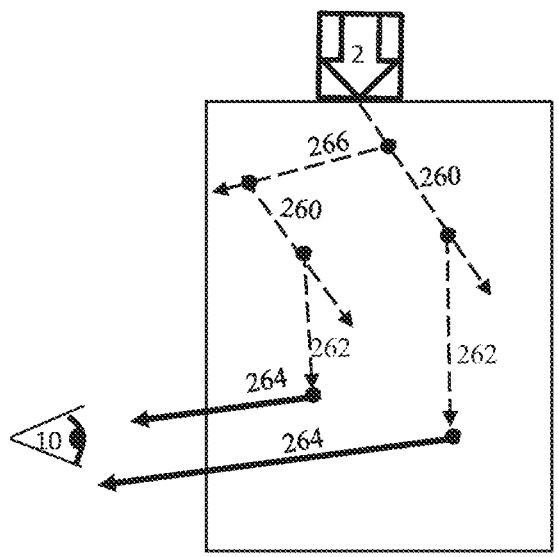
FIG. 23

FIG. 25
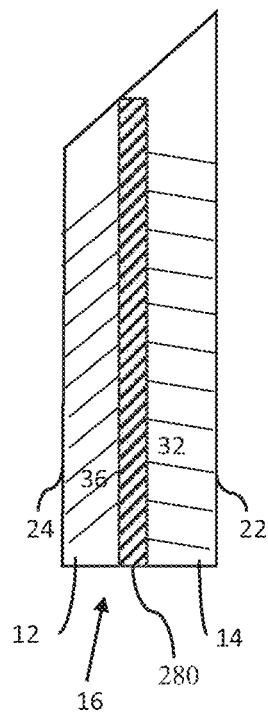
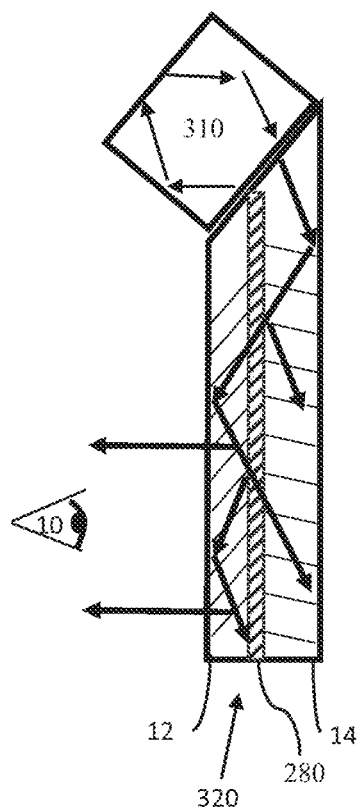
FIG. 26A
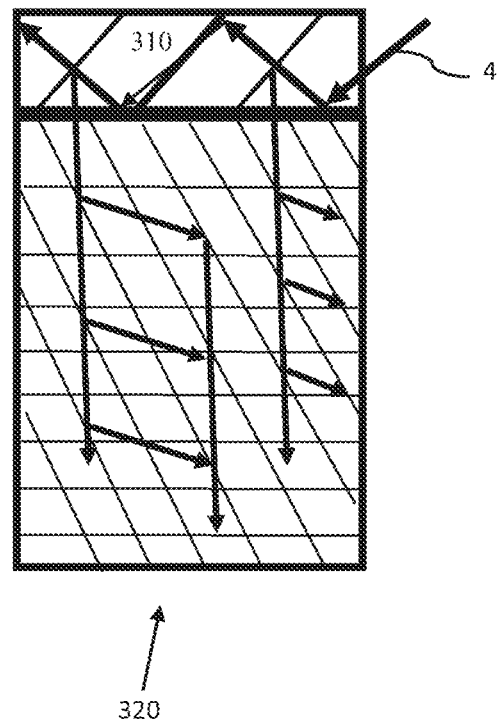
FIG. 26B

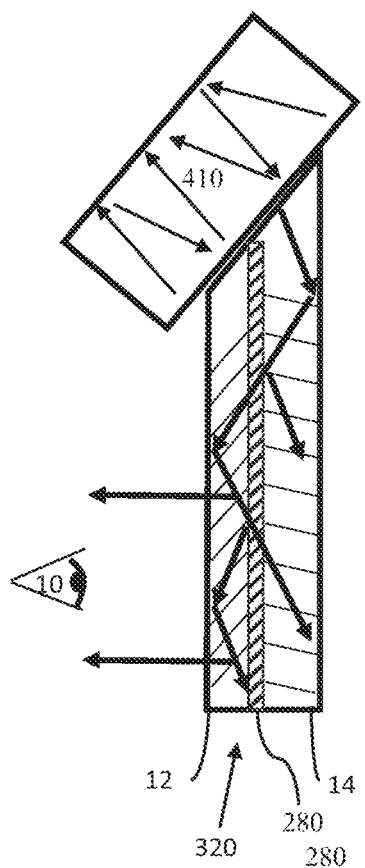 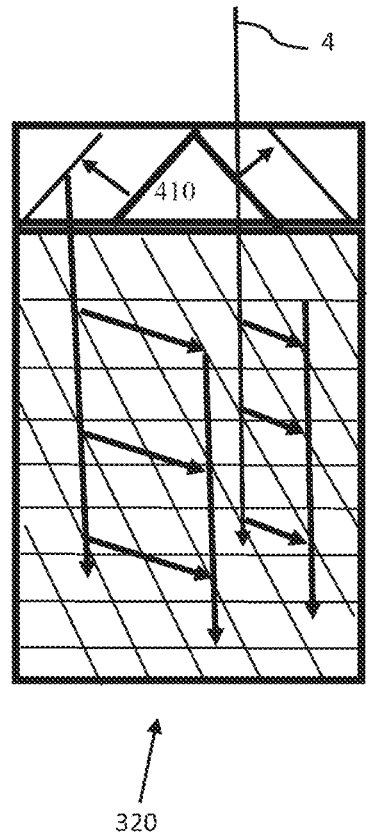
FIG. 27A   FIG. 27B
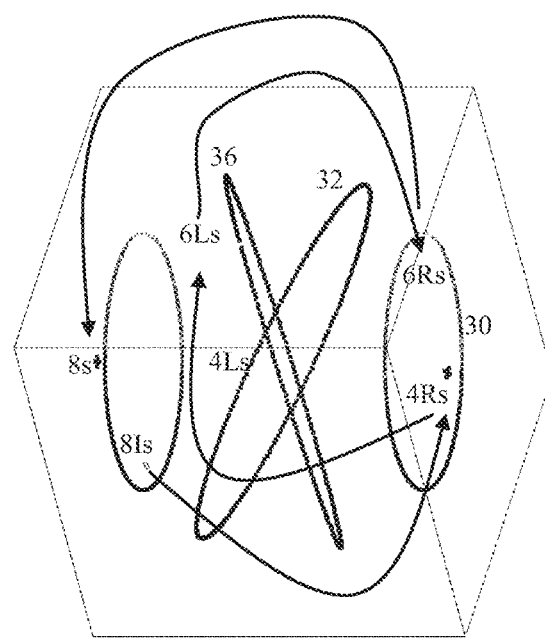
FIG. 28

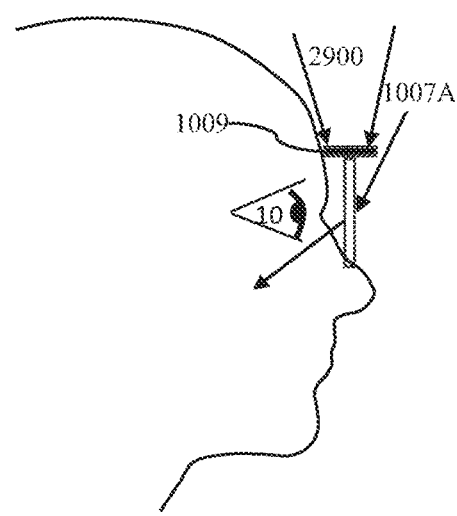
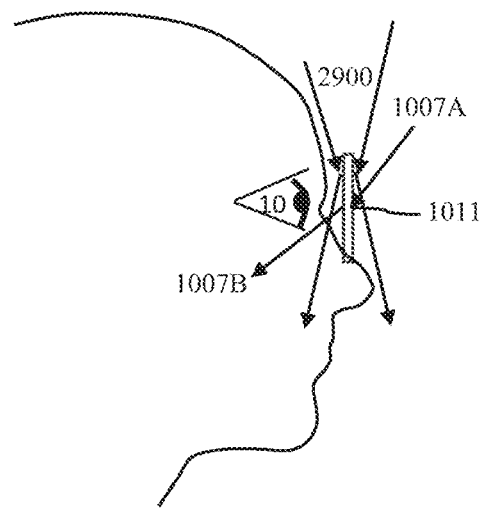
FIG. 29A  FIG. 29B
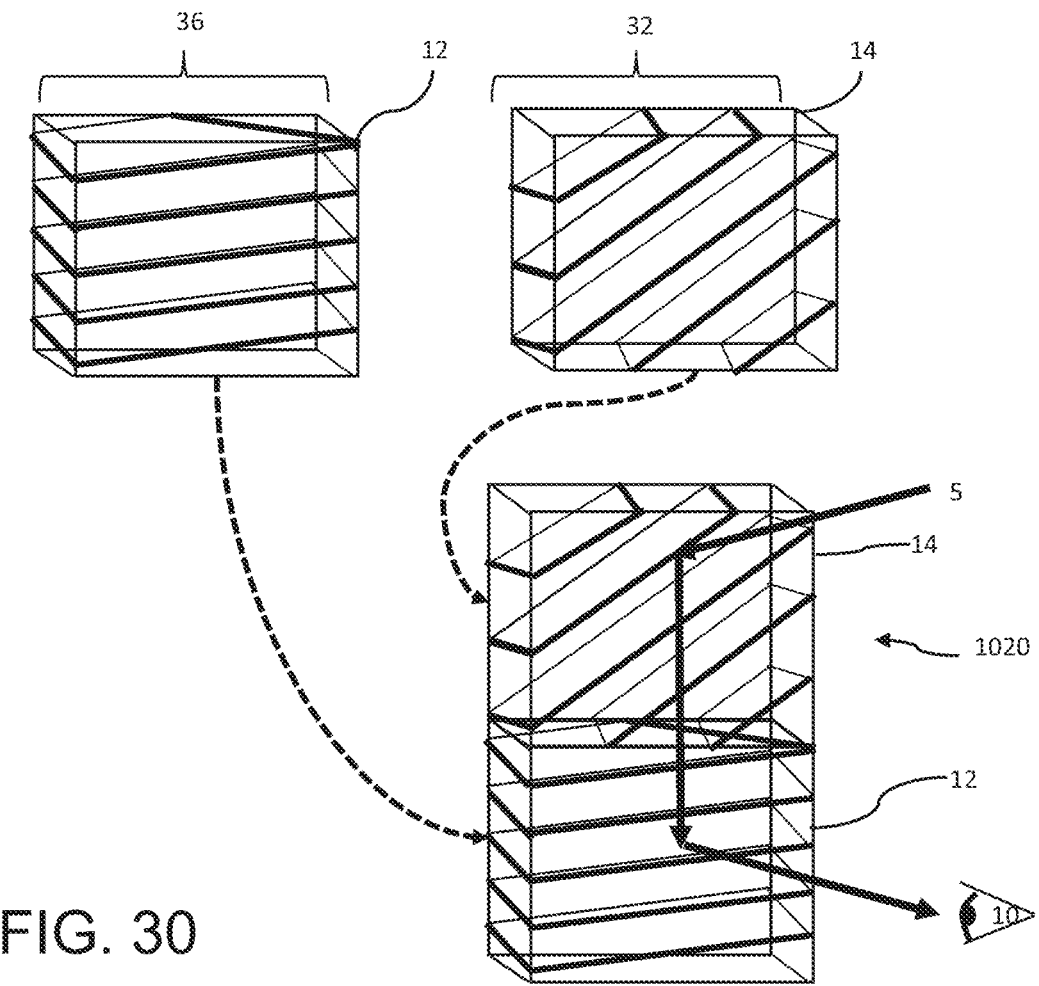
FIG. 30

LIGHT-GUIDE OPTICAL ELEMENT WITH MULTIPLE-AXIS INTERNAL APERTURE EXPANSION

FIELD OF THE INVENTION

The present invention generally relates to optical aperture expansion.

BACKGROUND OF THE INVENTION

Near eye display for augmented reality is based on a projector having a small aperture and a lightguide that multiplies (expands) this small aperture to project a larger aperture to illuminate a desired eye-box. If the projecting aperture is wide, then the expansion is in one dimension. If the projecting aperture is small (for example, in a two-dimensional (2D) lightguide), then the lightguide expansion is in two dimensions.

SUMMARY

Certain embodiments of the present invention provide a light-guide optical element with internal aperture expansion in at least two dimensions. Thus, according to an embodiment of the present invention, there is provided an optical device comprising: (a) a lightguide having: (i) a first pair of external surfaces parallel to each other, and (ii) at least two sets of facets, each of the sets: (A) including a plurality of partially reflecting facets parallel to each other, and (B) between the first pair of external surfaces, and (b) wherein in each of the sets of facets, the respective facets are: (i) at an oblique angle relative to the first pair of external surfaces, and (ii) non-parallel relative to another of the sets of facets.

According to a further feature of an embodiment of the present invention, the lightguide includes exactly two of the sets of facets.

According to a further feature of an embodiment of the present invention, the lightguide includes exactly three of the sets of facets.

According to a further feature of an embodiment of the present invention, at least a first set of the sets of facets provides continuous coverage as viewed in a viewing direction over a respective deployment area of the first set of facets so at least a portion of the light in the viewing direction passes through at least one facet of at least two sets of facets within the lightguide.

According to a further feature of an embodiment of the present invention, each of the sets of facets spans an area of coverage, the spanning being an area over which each of the sets of facets are deployed, and wherein the areas of coverage for two of the sets of facets are at least partially overlapping.

According to a further feature of an embodiment of the present invention, the lightguide is a one-section lightguide including: (a) a first set of the sets of facets, and (b) a second set of the sets of facets, wherein the first and second sets are overlapping in a same plane of a thickness dimension of the lightguide, the thickness dimension between the first pair of external surfaces. According to a further feature of an embodiment of the present invention, (a) the lightguide has a thickness dimension between the first pair of external surfaces, (b) facets of a first of the sets of facets extend across the thickness dimension so as to span a first depth band from a first depth to a second depth, and (c) facets of a second of the sets of facets extend across the thickness dimension so as to span a second depth band from a third depth to a fourth depth.

According to a further feature of an embodiment of the present invention, the first depth band and the second depth band span overlapping depths.

According to a further feature of an embodiment of the present invention, the first depth band and the second depth band span the same range of depths.

According to a further feature of an embodiment of the present invention, the first depth band and the second depth band are non-overlapping.

According to a further feature of an embodiment of the present invention, a section of facets is bounded by a boundary pair of surfaces parallel to, or coincident with, the first pair of external surfaces, the section containing at least one of the sets of facets.

According to a further feature of an embodiment of the present invention, the lightguide is a single section lightguide including a first section of the section of facets, the first section including two of the sets of facets.

According to a further feature of an embodiment of the present invention, the lightguide is a two-section lightguide including: (a) a first section of the section of facets having a first boundary pair of surfaces, and (b) a second section of the section of facets having a second boundary pair of surfaces, wherein one surface of the first boundary pair of surfaces is adjacent to one surface of the second boundary pair of surfaces and the first and second boundary pairs of surfaces are parallel.

According to a further feature of an embodiment of the present invention, the lightguide is a three-section lightguide further including a third section of the section of facets having a third boundary pair of surfaces, wherein one surface of the third boundary pair of surfaces is adjacent to one surface of either the first boundary pair of surfaces or the second boundary pair of surfaces, and wherein the third boundary pair of surfaces is parallel to the first and second boundary pairs of surfaces.

According to a further feature of an embodiment of the present invention, the lightguide includes: (a) a first section of the section of facets having a first boundary pair of surfaces, and (b) a second section of the section of facets having a second boundary pair of surfaces, (c) wherein the first and second boundary pairs of surfaces are parallel; and (d) at least one interface, each interface: (i) being at least partially between two sections, and (ii) parallel to the first pair of external surfaces, (c) wherein the interface is at least one selected from the group consisting of: (i) a partially reflecting surface, (ii) a partially reflective optical coating, (iii) a transition from a material of one of the sections to another material of another of the sections, (iv) a polarization modifying coating, and (v) a flexible intermediate layer.

According to a further feature of an embodiment of the present invention, a second of the sets of facets is configured to perform coupling-out of light from the lightguide, the second set of facets having a constant number of facets overlap in a line of sight toward a nominal point of observation of light coupling-out of the lightguide via one of the first pair of external surfaces.

According to a further feature of an embodiment of the present invention, there is also provided: (a) a coupling-in arrangement configured to guide light into the lightguide such that the light propagates via internal reflection of the first pair of external surfaces along the lightguide in a propagation direction with a first in-plane component, and (b) wherein in each of the sets of facets, the respective facets are orientated to deflect part of the light to be guided by internal reflection of the lightguide to propagate along the lightguide with a propagation direction with a second in-plane component non-parallel to the first in-plane component.

According to a further feature of an embodiment of the present invention, the coupling-in arrangement is a second lightguide including: (a) a second pair of external surfaces parallel to each other, and (b) a set of facets.

According to a further feature of an embodiment of the present invention, in at least one of the sets of facets, a spacing between each of the partially reflecting facets is configured such that, within a field of view of an image to be reflected by the one of the sets of facets, a distance over which a double reflection propagation step occurs along the lightguide does not match an exact multiple of the spacing.

According to a further feature of an embodiment of the present invention, a first angle of the partially reflecting facets in a first set of the at least two sets of facets is different from a second angle of the partially reflecting facets in a second set of the at least two sets of facets, the angles being relative to the first pair of external surfaces.

According to a further feature of an embodiment of the present invention, a first angle of the partially reflecting facets in a first set of the at least two sets of facets is substantially the same as a second angle of the partially reflecting facets in a second set of the at least two sets of facets, the angles being relative to the first pair of external surfaces and the first set is rotated relative to the second set.

According to a further feature of an embodiment of the present invention, there is also provided: (a) a light source providing input illumination into the lightguide, and (b) an image modulator reflecting propagating light generated by the lightguide from the input illumination, the reflecting producing reflected image light that traverses the lightguide.

There is also provided according to the teachings of an embodiment of the present invention, a method of producing an optical device, the optical device comprising a lightguide having: (i) at least two sets of facets between a first pair of external surfaces, (ii) the external surfaces parallel to each other, (iii) each of the sets of facets including a plurality of partially reflecting facets parallel to each other, and wherein in each of the sets of facets, the respective facets are: at an oblique angle relative to the first pair of external surfaces, and non-parallel relative to another of the sets of facets, the method comprising: (a) providing a first array of partially reflecting facets, (b) providing a second array of partially reflecting facets, and (c) optically attaching the first array and the second array such that the facets of the first array and the facets of the second array are at an oblique angle relative to the first pair of external surfaces, and non-parallel to each other.

According to a further feature of an embodiment of the present invention, the optically attaching is performed by pressing together the first and second arrays with a flowable adhesive between the first and second arrays.

According to a further feature of an embodiment of the present invention, a first angle of the partially reflecting facets in the first array is different from a second angle of the partially reflecting facets in the second array, the angles being relative to respective external surfaces of the arrays.

According to a further feature of an embodiment of the present invention, a first angle of the partially reflecting facets in the first array is substantially the same as a second angle of the partially reflecting facets in the second array, the angles being relative to respective external surfaces of the arrays, and the first array is rotated relative to the second array prior to optically attaching the arrays.

There is also provided according to the teachings of an embodiment of the present invention, a method of producing an optical device, the optical device comprising a lightguide having: (i) at least two sets of facets between a first pair of external surfaces, (ii) the external surfaces parallel to each other, (iii) each of the sets of facets including a plurality of partially reflecting facets parallel to each other, and wherein in each of the sets of facets, the respective facets are: at an oblique angle relative to the first pair of external surfaces, and non-parallel to another of the sets of facets, the method comprising: (a) providing a plurality of transparent flat windows having partially reflecting surfaces; (b) optically attaching together the windows so as to create a first stack, (c) slicing the first stack to create a plurality of first flat arrays, the slicing across a plurality of the windows and at an oblique angle relative to at least two pairs of opposing sides of the first stack, (d) optically attaching together a plurality of the first flat arrays so as to create an array stack, and (e) slicing the array stack to create at least one the lightguide, the slicing across a plurality of the first flat arrays and at an oblique angle relative to at least two pairs of opposing sides of the array stack.

According to a further feature of an embodiment of the present invention, the first flat arrays are polished and coated before being optically attached to create the array stack.

There is also provided according to the teachings of an embodiment of the present invention, a method for expanding an optical aperture in two dimensions by providing an image as a light input to the aforementioned optical device.

BRIEF DESCRIPTION OF FIGURES

The embodiment is herein described, by way of example only, with reference to the accompanying drawings, wherein:

FIG. 22A, there is shown sections separated by a partially reflecting coating.

FIG. 22B, there is shown an alternative, smaller, optical arrangement.

FIG. 22C, there is shown an alternative embodiment with a partial reflector.

FIG. 23, there is shown a schematic sketch of propagation of light within a lightguide with non-optimal expansion.

FIG. 25, there is shown a safety binder between sections.

FIG. 26A and FIG. 26B, there are shown respective side and front views of a 2D lightguide feeding a two-section lightguide.

FIG. 27A and FIG. 27B, there are shown respective side and front views of a 1D lightguide feeding a two-section lightguide.

FIG. 28 there is shown an angular diagram of an undesired image overlapping the virtual image.

FIG. 29A there is shown a shade to prevent high angle light from reaching the lightguide.

FIG. 29B there is shown an angular sensitive coating to prevent high angle light from reaching the lightguide.

FIG. 30, there is shown an alternative combination of sections.

DETAILED DESCRIPTION—FIRST EMBODIMENT—FIGS. 1 TO 32B

The principles and operation of the system according to a present embodiment may be better understood with reference to the drawings and the accompanying description. A present invention is a system for optical aperture expansion. In general, an image projector having a small aperture projects an input beam that is multiplied by a lightguide having more than one set of parallel partially reflecting surfaces or "facets," preferably having optimized coatings. Alternative embodiments employ a combination of facets and diffractive elements. This reduces the need for aperture expansion outside the transparent lightguide, reducing the size and weight of the system.

An optical device includes a lightguide having a first pair of external surfaces parallel to each other, and at least two sets of facets. Each of the sets including a plurality of partially reflecting facets parallel to each other, and between the first pair of external surfaces. In each of the sets of facets, the respective facets are at an oblique angle relative to the first pair of external surfaces, and at a non-parallel angle relative to another of the sets of facets.

Figure 31:
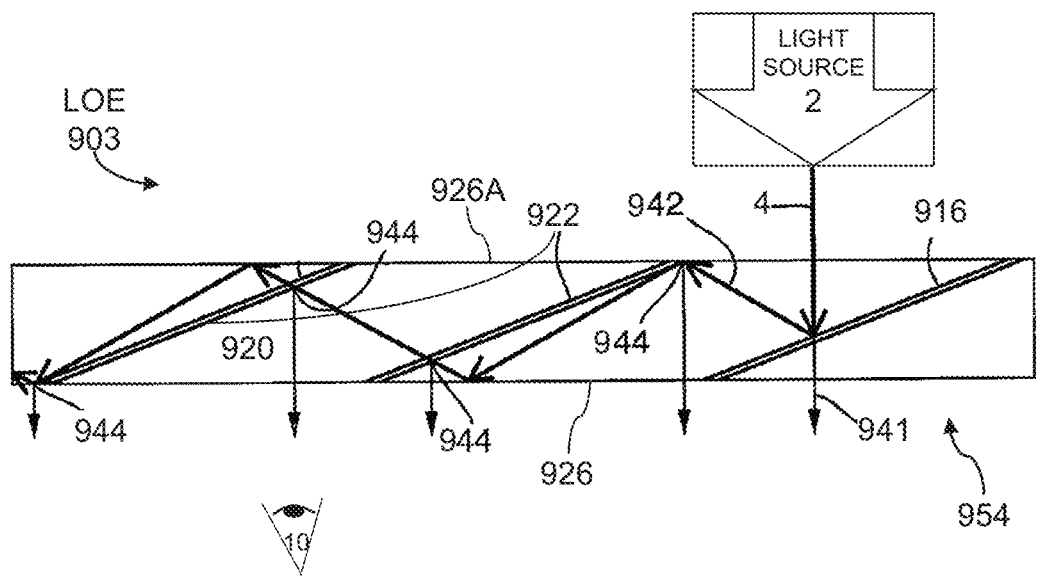
FIG. 31, there is shown a side view of an exemplary lightguide optical element (LOE) configured for use with the current embodiment.

Referring to FIG. 31, there is shown a side view of an exemplary lightguide optical element (LOE) 903 configured for use with the current embodiment. A first reflecting surface 916 is illuminated by an input collimated display light ray (input beam) 4 emanating from a light source 2. In the context of this document, the light source 2 is also referred to as a "projector." For simplicity in the current figures, only one light ray is generally depicted, the incoming light ray, the input beam 4, also referred to as the "beam" or the "incoming ray". Generally, wherever an image is represented herein by a light beam, it should be noted that the beam is a sample beam of the image, which typically is formed by multiple beams at slightly differing angles each corresponding to a point or pixel of the image. Except where specifically referred to as an extremity of the image, the beams illustrated are typically a centroid of the image. That is, the light corresponds to an image and the central ray is a center ray from a center of the image or a central pixel of the image A first region 954 is proximal to input beam 4 where an image illumination is coupled into a lightguide 920. The reflecting surface 916 at least partially reflects the incident light of the input beam 4 from the source 2 such that the light is trapped inside the lightguide 920 by internal reflection, typically total internal reflection (TIR). The lightguide 920 is typically a transparent substrate, and is also referred to as a "planar substrate", "light-transmitting substrate", and waveguide. The lightguide 920 includes at least two (major, external) surfaces, typically parallel to each other, shown in the current figure as a back (major) surface 926 and a front (major) surface 926A. Note that the designation of "front" and "back" with regard to the major surfaces (926, 926A) is for convenience of reference. Coupling-in to the lightguide 920 can be from various surfaces, such as the front, back, side edge, or any other desired coupling-in geometry.

The input beam 4 enters the lightguide substrate at a proximal end of the substrate (right side of the figure). Light propagates through the lightguide 920 and one or more facets, normally at least a plurality of facets, and typically several facets, toward a distal end of the lightguide 920 (left side of the figure). The lightguide 920 typically guides rays of propagating light in the substrate by internal reflection of the external surfaces.

After optionally reflecting off the internal surfaces of the substrate 920, the trapped waves reach a set of selectively reflecting surfaces (facets) 922, which couple the light out of the substrate into the eye 10 of a viewer. In the current exemplary figure, the trapped ray is gradually coupled out from the substrate 920 by the other two partially reflecting surfaces 922 at the points 944.

Internal, partially reflecting surfaces, such as the set of selectively reflecting surfaces 922 are generally referred to in the context of this document as "facets." For augmented reality applications, the facets are partially reflecting, allowing light from the real world to enter via front surface 926A, traverse the substrate including facets, and exit the substrate via back surface 926 to the eye 10 of the viewer. Exemplary ray 942 shows light of the input beam 4 partially reflected from reflecting surface 916, and exemplary ray 941 shows light of the input beam 4 partially transmitted through reflecting surface 916.

The internal partially reflecting surfaces 922 generally at least partially traverse the lightguide 920 at an oblique angle (i.e., non-parallel, neither parallel nor perpendicular) to the direction of elongation of the lightguide 920. Partial reflection can be implemented by a variety of techniques, including, but not limited to transmission of a percentage of light, or use of polarization.

The lightguide 920 optionally has a second pair of external surfaces (not shown in the current figure side view) parallel to each other and non-parallel to the first pair of external surfaces. In some implementations, the second pair of external surfaces is perpendicular to the first pair of external surfaces. Typically, each of the facets is at an oblique angle to the second pair of external surfaces. In other cases, where reflections from peripheral surfaces of the lightguide are not desired, those peripheral surfaces are typically left unpolished and/or coated with light absorbent (e.g., black) material to minimize undesired reflections.

Figure 1:
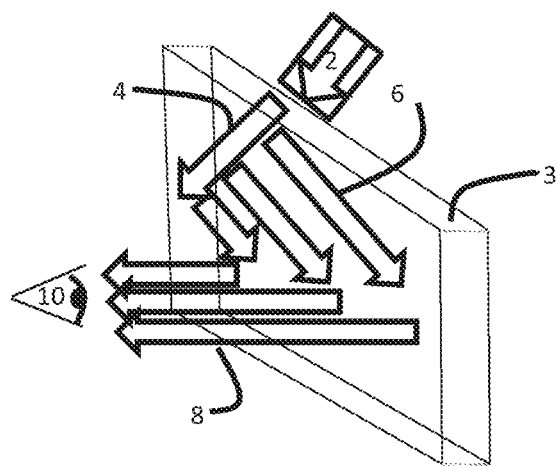
FIG. 1, there is shown a high-level, schematic sketch showing the beam-expanding effect of a lightguide have two overlapping sets of partially reflecting internal facets.

Referring to FIG. 1, there is shown a high-level, schematic sketch showing the beam-expanding effect of a lightguide 3 have two overlapping sets of partially reflecting internal facets at different orientations, having two beam-spreading processes by the facets within the lightguide 3. The projector 2 projects an image into the lightguide 3 as the input beam 4. One set of facets (a first set of facets, shown in the below figures) divert continually a proportion of the input beam (projected image) 4 into first guided beams (projected image) 6. Distinctively, according to certain particularly preferred implementations, this set of first facets are angled such that both the incident image rays of the input beam 4 and the reflected image rays of the first guided beams 6 are within angular ranges that are trapped by internal reflection at main substrate surfaces (external surfaces) of the lightguide 3, and are therefore guided by the light-guide (also referred to as the "substrate" or "waveguide") of the lightguide 3. Integrated into the same light-guide, most preferably in overlapping relation to the first set of facets are another, second set of facets at a different angle from the angle of the first set of facets. The second set of facets divert a proportion of the first guided beams (projected image) 6 to second guided beams (projected image) 8. The second guided beams 8 are coupled out of the lightguide 3, typically into the eye 10 of the observer.

Figure 2:
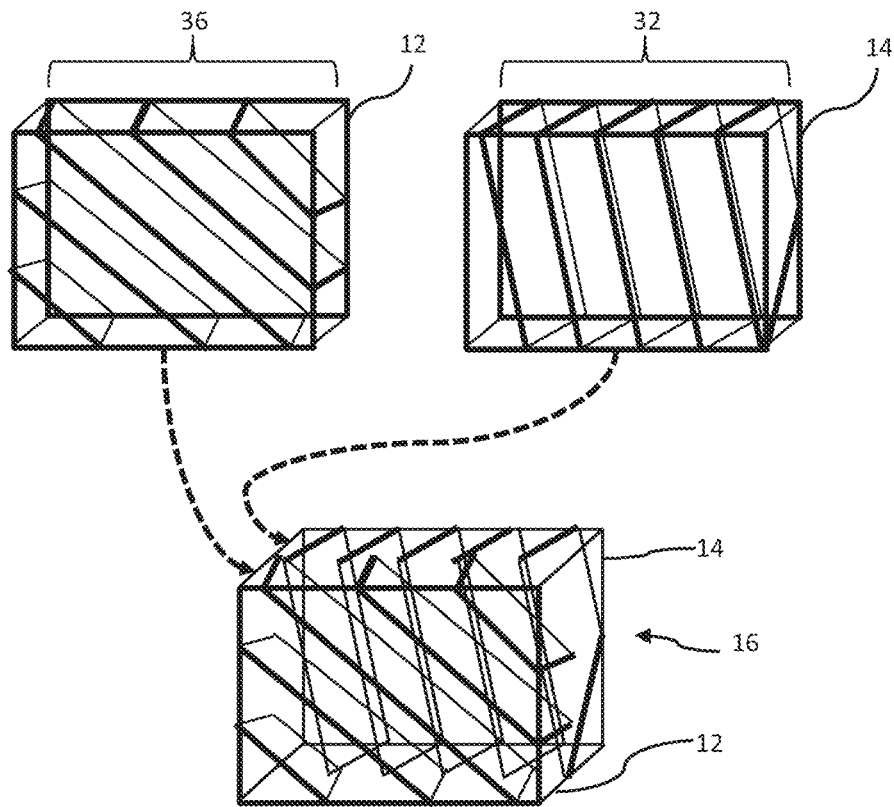
FIG. 2, there is shown a schematic sketch of an exemplary configuration of the lightguide.

Referring to FIG. 2, there is shown a schematic sketch of an exemplary configuration of the lightguide 3. In a first set of non-limiting implementations, the lightguide 3 is comprised of two layers having different orientations of internal facets. Each of a first section 14 and a second section 12 can be LOEs 903, as described above. As such, the first and second sections are referred to in the context of this document as respective first and second LOEs, or first and second layers, or first and second facet sections. Each section contains a respective set of facets. The first section 14 includes a first set of facets 32 and the second section 12 includes a second set of facets 36. The first and second sections (14, 12) are deployed in an overlapping relation relative to the viewing direction of the user (the user's eye 10). In this example, second layer 12 overlaps on top of first layer 14 to generate an overlapping facet pattern of a final lightguide 16. Note, the orientations depicted in the current figure are shown simply and roughly for clarity of the description. As the lightguide 16 has at least two sets of facets that at least partially overlap in the viewing direction of a user, the lightguide 16 is also referred to as an "overlapping lightguide."

Each set of facets provides coverage over a given deployment area of the section containing the set of facets. At least a first set of facets provides continuous coverage as viewed in a viewing direction over a respective deployment area of the first set of facets. The deployment area of a set of facets includes the area (space) between the facets. A preferred configuration of the facets can be described by extrapolating lines of intersection from the facets to the surface of the lightguide. Given a first set of lines of intersection between the planes of a first set of facets and the plane of an external surface and given a second set of lines of intersection between planes of a second set of facets and the same plane (of an external surface of the lightguide) the first and second sets of lines are non-parallel.

Considerations for determining orientations of the facets in these layers will be described below. Note that in FIG. 1 the lightguide 3 is initially shown at a high-level, while in FIG. 2 the lightguide 16 is shown with detail of internal structure (first and second sections). The lightguide 16 having two sets of (parallel) facets can be described as having have "two axis", while a lightguide having an arbitrary number of sets of facets (more than one) can be described as a "few axis" lightguide. In this context, each "axis" is a direction of beam expansion of the lightguide 3, the direction in the lightguide 3 in which facets are arrayed.

Figure 3:
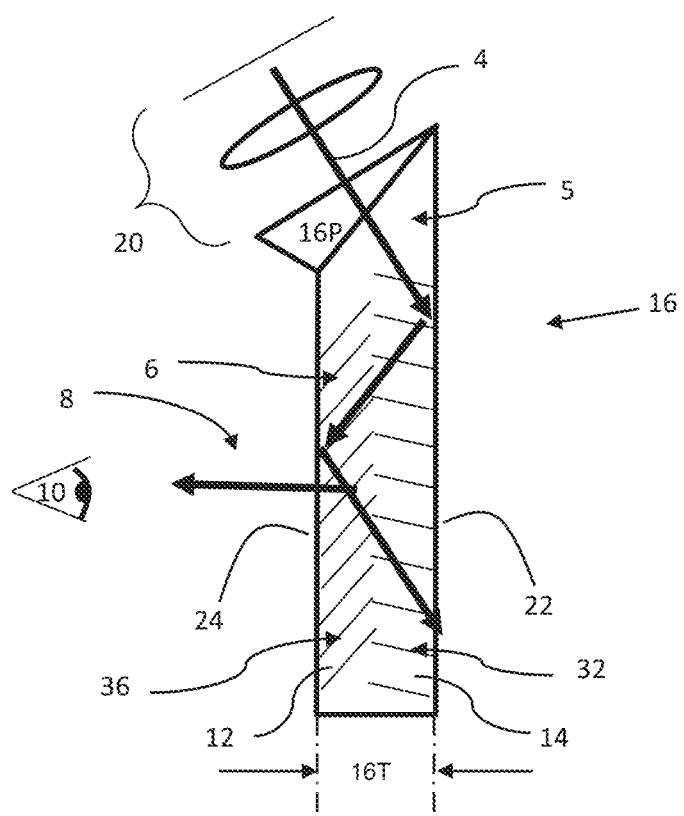
FIG. 3, there is shown a side view schematic sketch of light propagating in the lightguide.

Referring to FIG. 3, there is shown a side view schematic sketch of light propagating in the lightguide 16. The first layer 14 includes the first set of facets 32 (also referred to as first section facets, or first facets). Similarly, the second layer 12 includes the second set of facets 36 (also referred to as second section facets, or second facets). The lightguide 16 has a thickness 16T between a first external face (surface) 22 and a second external face (surface) 24 (respectively similar to back surface 926 and a front surface 926A). Typically, the first layer 14 and the second layer 12 are optically attached so light passes between these layers without reflection. Guidance of light internal to each layer is achieved by internal reflection, typically by the mechanism of total internal reflection (TIR), from the external faces of the lightguide 16. In the current figure, the projector 2 is implemented by an optical arrangement 20. A prism 16P is part of a coupling-in arrangement to the lightguide 16. The optical arrangement 20 illuminates the lightguide 16 with an in-coupled image (the input beam 4) collimated to infinity (for example, as described in patent WO 2015/162611 to Lumus LTD). As the light propagates 5 within the lightguide 3, the propagating light 5 is reflected by internal reflection from the first external face 22 and the second external face 24 of the lightguide 16. The current figure's first external face 22 and the second external face 24 for the lightguide 16 are respectively similar to FIG. 31's the front surface 926A and the back surface 926 of the LOE 903.

The first section 14 of the lightguide 16 includes internal facets that reflect the propagating light 5 laterally (a change in direction which is not discernible in the current figure's side view) as the first guided beams 6. Second section 12 includes facets that reflect the propagating light 4A as the second guided beams 8 toward the eye-box 10 of the observer. The facets within every section are preferably overlapping (in a sense defined in patent application PCT/IL2018/050025 to Lumus LTD, which is hereby incorporated in its entirety), where light in the direction of the viewing eye 10 of the observer passes through more than one facet in each sequence of facets) in order to enhance the uniformity of the image illumination.

Light is guided into the lightguide 16, typically by a coupling-in arrangement, for example, the optical arrangement 20 and the prism 16P. The coupling-in arrangement and/or image projector are configured to guide light into the lightguide 16 such that the propagating light 5 propagates via internal reflection of the external surfaces (22, 24) along the lightguide 16 in a propagation direction with a first in-plane component. (The out-of-plane component reverses at each internal reflection from the major external surfaces of the lightguide.) At least the first set of facets 32 are orientated to deflect part of the light to be guided by internal reflection of the lightguide 16 to propagate along the lightguide 16 with a propagation direction with a second in-plane component non-parallel to the first in-plane component. This redirection of the image through partial reflection at a sequence of facets achieves aperture multiplication in a first dimension within the lightguide. A coupling-out arrangement is typically configured for coupling-out at least part of the light propagating with the second in-plane component. The coupling-out arrangement is typically the second (or a third) set of partially reflective facets 36, which achieve a further aperture multiplication in the second in-plane direction.

The second section 12 (with the coupling-out facets) is preferably closer to the eye 10 of the observer so the out-coupled light (the second guided beams 8) will not be disturbed, although the reverse configuration also falls within the scope of the present invention, and may be preferable in certain applications.

Now is described an exemplary implementation of the lightguide 16 using glass having a refractive index of 1.5955, and coupling out (transmitting) a rectangular image of 40 degree diagonal.

Figure 4:
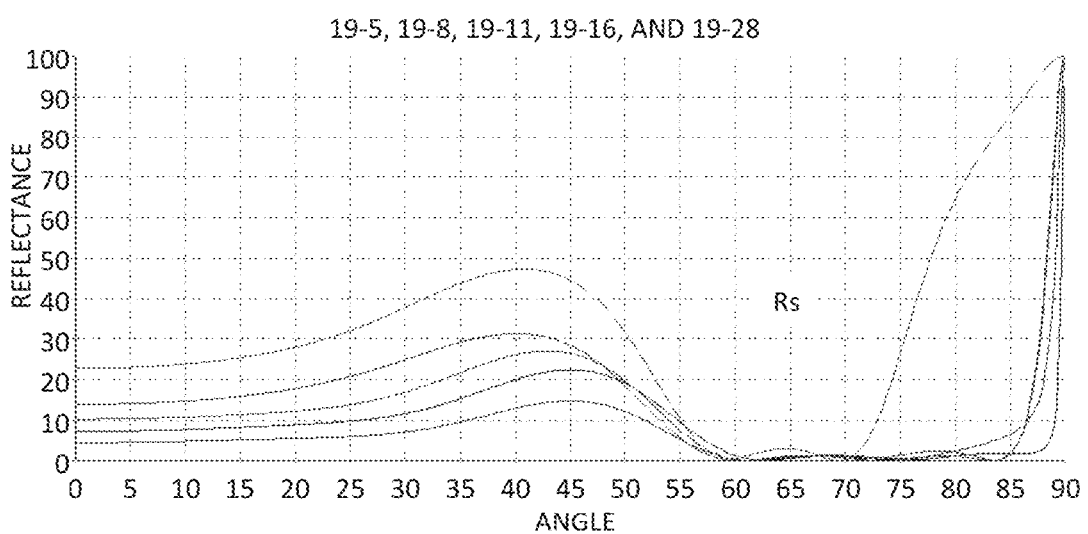
FIG. 4, there is shown a graph of reflectance verses angle for reflectivities of various coatings having different reflectivity amplitude.

Referring to FIG. 4, there is shown a graph of reflectance verses angle for reflectivities of various coatings having different reflectivity amplitude. Preferably, the coating of the facets should be designed to obtain maximal efficiency and minimal energy coupled to ghost images. In preferred embodiments, image reflectivity exists at incidence angles of 0 to 55 degrees from a normal to the surface, while the coating is practically transparent at 55 to 87 degrees (except for the high reflectivity coating that is transparent up to 72 degrees) from a normal to the surface. These characteristics of the coatings determine the angular facet design. This characteristic of the coatings are almost the same for the entire visible spectrum, therefore a single lightguide will transmit all colors (commonly referred to as RGB, or red, green, and blue). Facets at further distance (toward the distal end of the lightguide) from the entrance of light into the lightguide (the proximal end of the lightguide) are preferably provided with coatings with higher reflectivity.

Figure 5:
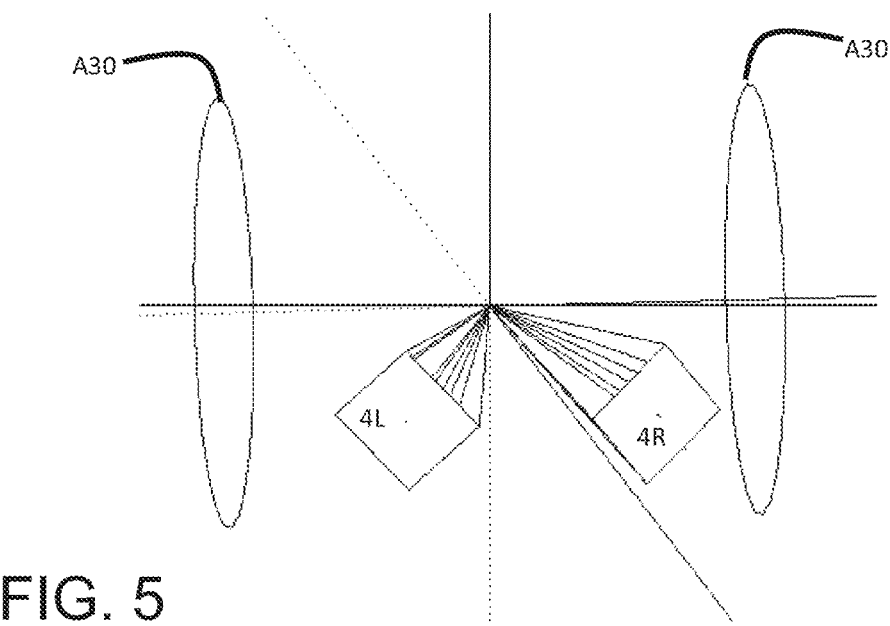
FIG. 5, the geometric optical properties of the lightguide are illustrated in angular space.

Referring to FIG. 5, the geometric optical properties of the lightguide 16 are illustrated in angular space. The TIR critical angle limits of both external faces (first external face 22 and second external face 24) are presented as circles A30, where rays directed within those circles will escape from the substrate and rays directed outside those circles will remain trapped within the substrate. The injected image light into the lightguide 16, input beam 4, has rectangular angular distribution. The input beam 4 bounces back and forth between the external faces (first external face 22 and second external face 24), and is shown as squares 4L and 4R (conjugate images reflected in the main substrate surfaces, equivalent to the input beam 4 in FIG. 1).

Figure 6:
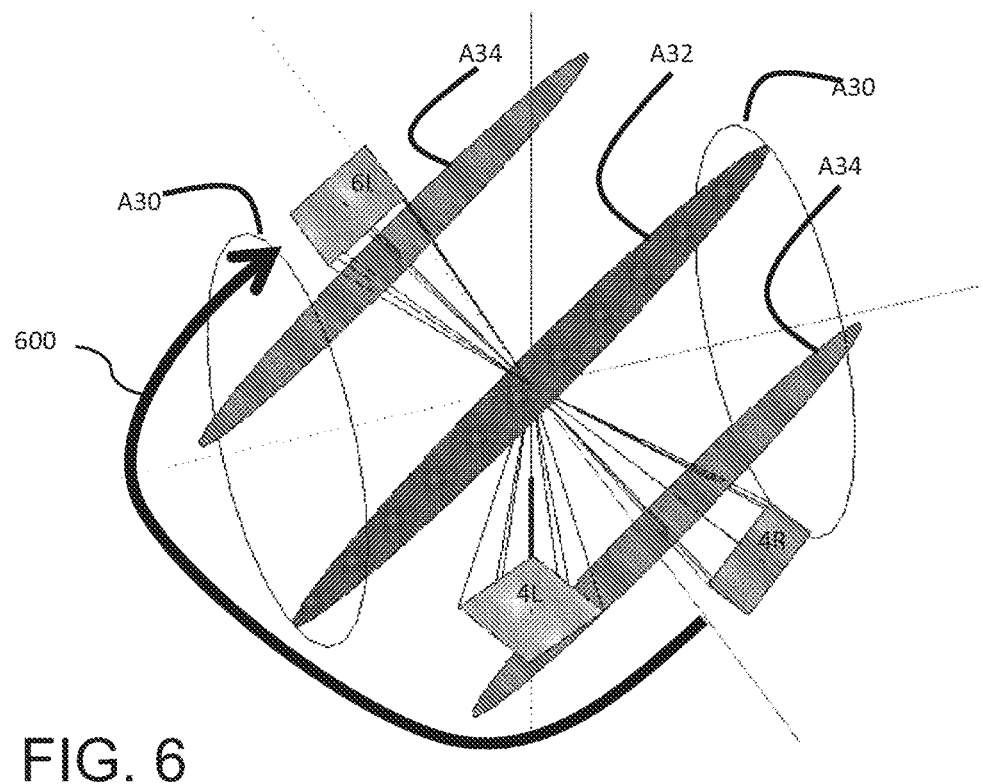
FIG. 6, there is shown an angular space orientation of the facets of the lightguide.

Referring to FIG. 6, there is shown an angular space orientation of the facets of the lightguide 16. The image light input beam 4 first encounters the first set of facets 32 within first section 14 of the lightguide 16. The angular space orientation of the first set of facets 32 is shown as a plane denoted by circle A32. These first section facets 32 are coated with a coating that has angular reflectivity as shown in FIG. 4. The angle from which the coating is transparent (55 degrees in this example) is shown as circles A34. Therefore, any image shown between (outside) these circles (i.e., with angles inclined to the normal to the facets by more than 55 degrees, such as 4L in the current figure) will pass through the coated facet with minimal reflectance. Images that fall within these circles (i.e., with angles inclined to the normal to these facets by angled less than 55 degrees, such as 4R in this figure) will be partially reflected. The reflection will be to an opposite angle relative to facet angle A32. Therefore, image 4R is reflected (as shown by arrow 600) to generate a conjugate image 6L (that corresponds to the first guided beams 6). As the image propagates within the lightguide 16, some of the light will bounce back and forth between 4R and 6L, thereby improving uniformity of the final image illumination.

Figure 7:
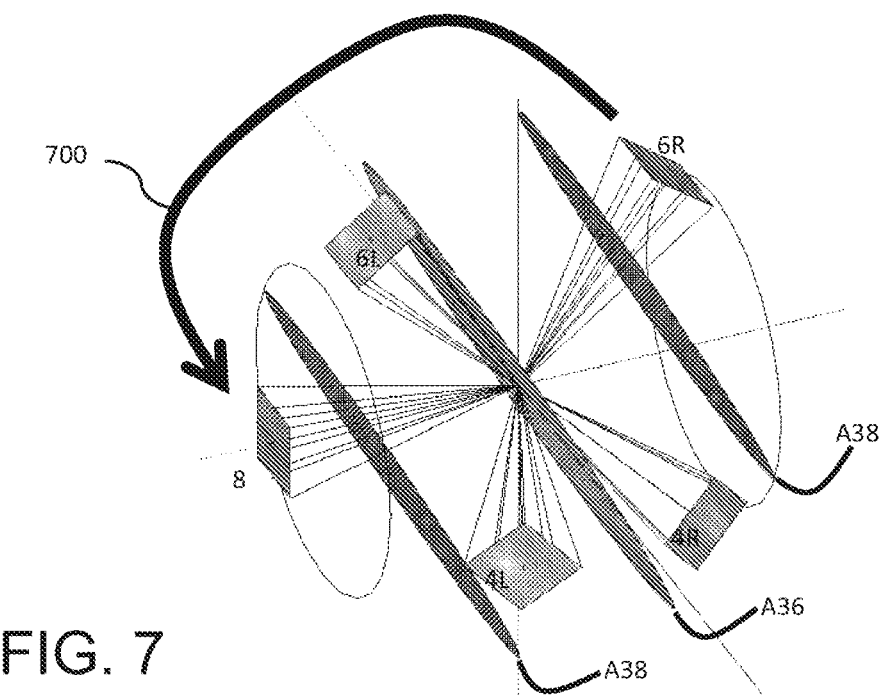
FIG. 7, there is shown the geometric optical properties of the second set of facets FIG. 8, there is shown an angular space diagram of an alternative implementation of facets and coating margins.

Referring to FIG. 7, there is shown the geometric optical properties of the second set of facets 36. The light image 6L reflects from the external faces (22, 24) of the lightguide 16 to generate conjugate image 6R. The images 6L and 6R propagate while being reflected from the faces (22, 24) and encountering facets (second section facets 36) of second section 12, for which the orientation is presented here as A36. The coating on the second section facets 36 also has transparent range (as A34 in FIG. 6) and the margins of the transparent range are shown as circles A38.

The images 6L, 4L and 4R are within the transparent range (between the circles A38), and therefore will not be significantly reflected by the second facets 36 of the second section 12. However, the image 6R lies within the 55 degree cut-off, and will therefore be partially reflected by the second facets 36, ending up at a range of angles which escape from the internal reflection of the substrate main surfaces, being delivered (as shown by arrow 700) outside the lightguide 16 as image 8 (the second guided beams 8) toward the eye-box 10 of the observer.

Figure 8:
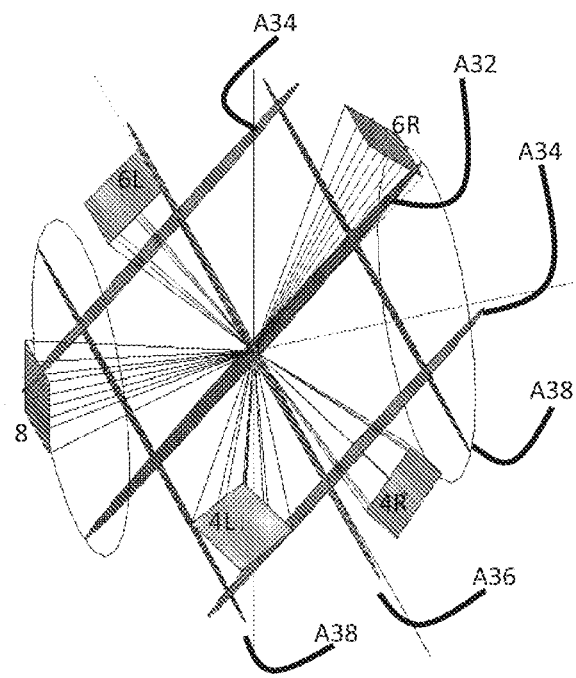

Referring to FIG. 8, there is shown an angular space diagram of an alternative implementation of facets and coating margins. Images 4L and 4R are not reflected by the second facets 36 of the second section 12 (within the margin A38 representing angle >55 degrees). In addition, the images 4L and 6R are not reflected by the first facets 32 of the first section 14 (within the margins A34).

In an exemplary case, assuming the first image coupled into the lightguide 16 is the image 4L, the images are coupled in the following order:

1. The image 4L: coupled into the lightguide 16 by projector optics 20.
2. The image 4R: generated as conjugate to the image 4L by internal reflection within the lightguide 16.
3. The image 6L: generated by reflection of the image 4R by the first facets 32.
4. The image 6R: generated as conjugate to the image 6L by internal reflection within the lightguide 16.
5. The image 8: generated by reflection of the image 6R by the second facets 36.

Different angular configurations can be used having same basic properties of coupling the same order of images, as described above. It will be noted that both the incident images 4R impinging on first facets 32 and the reflected images 6L coming from second facets 36 are within the ranges of angles that are internally reflected by the major surfaces [external faces (22, 24)] of the substrate, and are therefore guided by the substrate. Internal reflection via the external faces (22, 24) of the lightguide 16 is similar to the internal reflection via the major surfaces (926, 926A) of the substrate 920 of the LOE 903.

Although preferred implementations illustrated here are designed to optimize the angles of each image in relation to each facet so that the images are selectively partially reflected or are transmitted with minimal reflection according to the angularly selective properties of the facet coatings, it should be noted that such optimization is not essential. In some cases, it may be acceptable to employ non-optimized angles and/or non-optimized coatings, resulting in the generation of various undesired modes (corresponding to ghost images), so long as the ghosts are either relatively low energy modes or fall outside the field of view of the desired output image.

Figure 9:
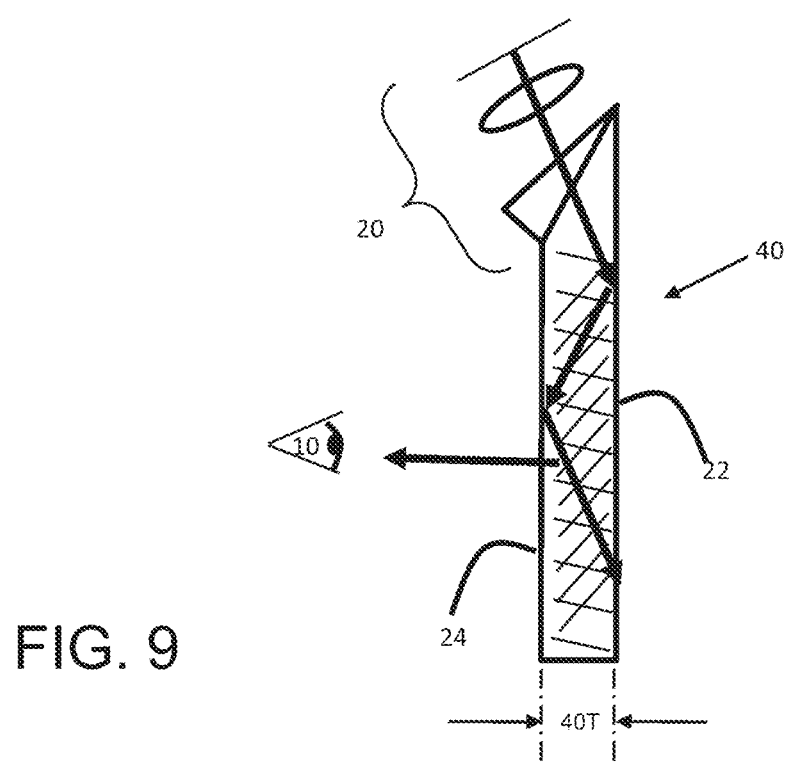
FIG. 9, there is shown another embodiment of a lightguide, where the sections the first section and the second section are overlapping in the thickness dimension of the lightguide to generate a single section lightguide having intersecting facets.

Referring to FIG. 9, there is shown another embodiment of an lightguide 16, where the sections the first section 14 and the second section 12 are overlapping in the thickness dimension of the lightguide to generate a single section lightguide 40 having intersecting facets. In other words, the sets of facets, in this case the first set of facets 32 and the second set of facets 36, are overlapping and arrayed (constructed) in the same plane of the lightguide. The single section lightguide 40 has a thickness 40T between the first external face 22 and the second external face 24. A method of producing such lightguide is described below. The angles of the facets in the single section lightguide 40 are similar to the above-described facets for a two section lightguide 16, with reference to FIG. 4 and FIG. 8.

Figure 10:
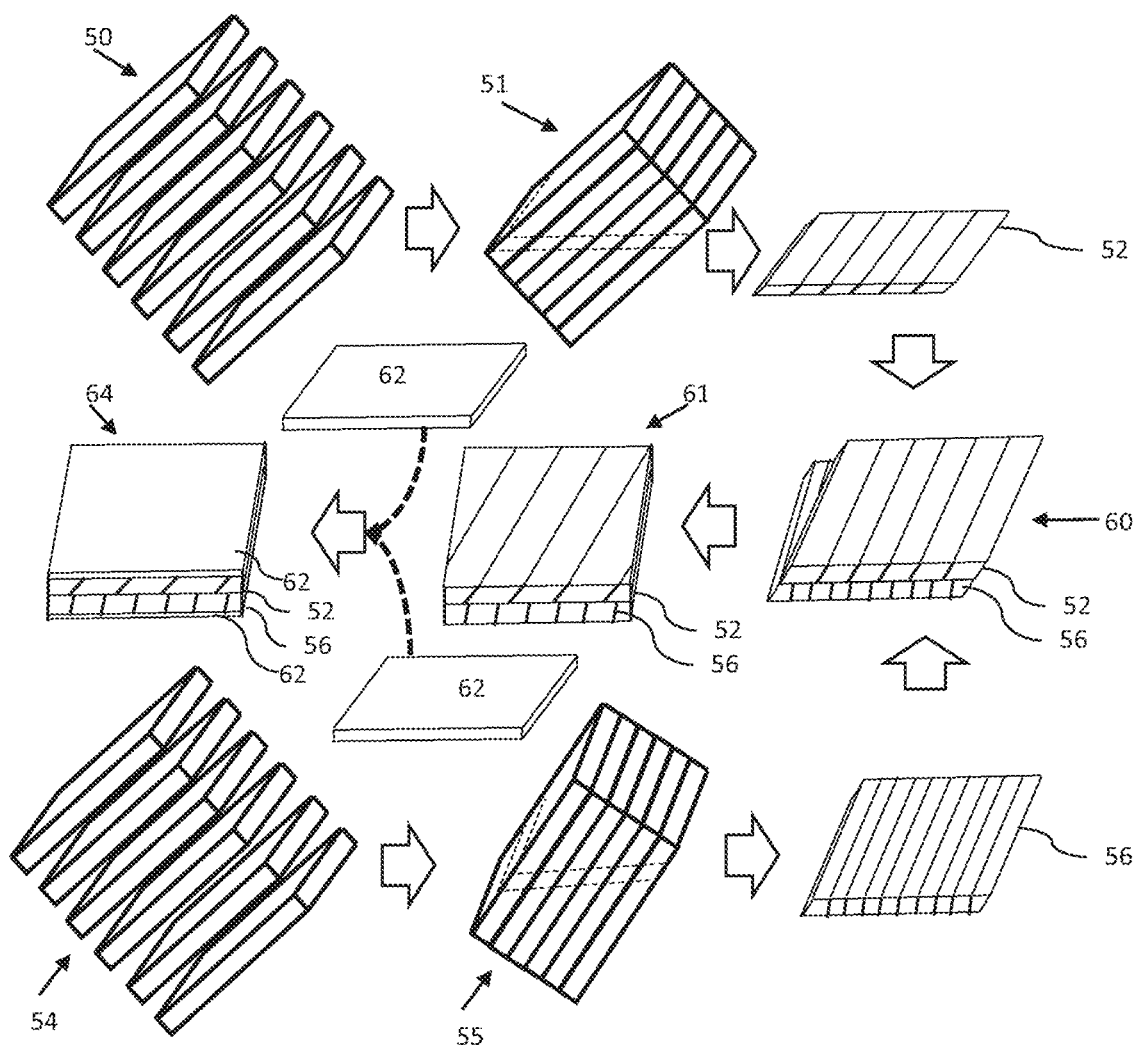
FIG. 10, there is shown a method for producing the two-section lightguide

Referring to FIG. 10, there is shown a method for producing the two section lightguide 16. Refer back also to FIG. 2 and FIG. 3. A first set of windows 50 are coated and cemented (stacked) together to create a first stack 51. In this context, the term "window" refers to a transparent, flat plate. The first stack 51 is sliced at an angle to generate a first array of reflecting surfaces 52. Similarly, a second set of windows 54 (another set, different from the first set of windows 50) are coated and cemented (stacked) together to create a second stack 55. The second stack 55 is sliced at a second angle (another angle, different from the angle used to slice the first stack 51) to generate a second array of reflecting surfaces 56. The two arrays (the first array 52 and the second array 56) are attached together 60 at the appropriate relative angle (for example, cemented or glued at a desired angle relative to one another). The overlapping arrays are trimmed 61 to produce a desired shape for the lightguide 16. In some embodiments, optional covers 62 are glued as external faces of the final two section lightguide 64. Each step can include optional cutting, grinding, and polishing of one or more surfaces. More than one array can be fabricated from each stack, according to the actual size of the windows and desired size of lightguide 64.

Substantial cost reduction may be achieved by using same arrays (facet plates) for both sections of the lightguide 16. For example, BK7 glass is used to produce two arrays (first array 52), each array having facets at 26 degrees. This differs from the above description of producing two arrays (first array 52 and second array 56, each having facets at different angles). Then the two arrays are attached together 60 at an angle of 115 degrees twist relative to each other. This exemplary configuration enables transmission of an image having 38 degrees at 16:9 field ratio.

Figure 11:
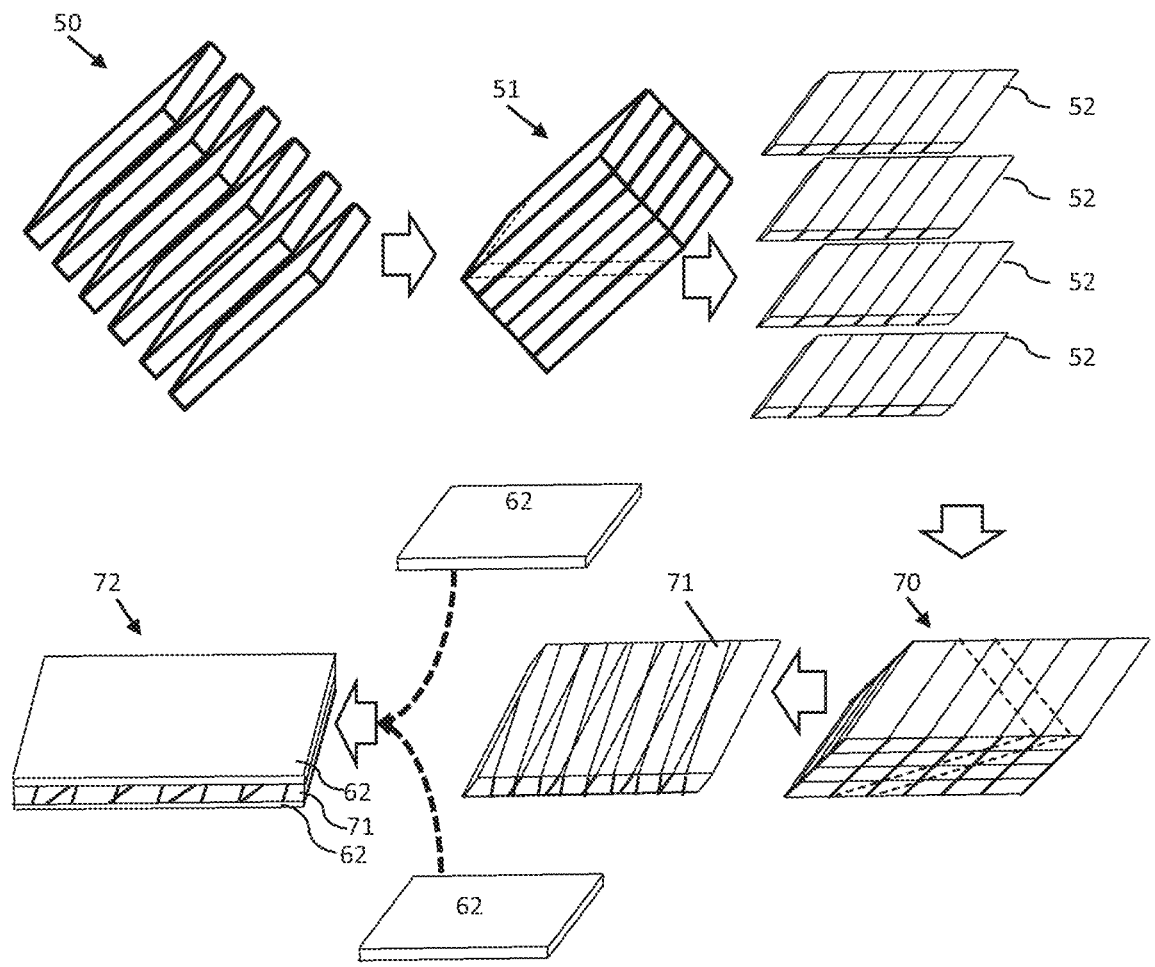
FIG. 11, there is shown an exemplary method for producing a single section lightguide.

Referring to FIG. 11, there is shown an exemplary method for producing a single section lightguide 40. Similar to the description in reference to FIG. 10 of producing a two section lightguide 16, a first set of windows 50 are coated and stacked to create a first stack 51. The stack is sliced into multiples of first array 52. The first array 52 slices are polished, coated, and stacked together to generate an array stack 70. This array stack 70 can be similar to first stack 51, however, in this case there are extra coated layers in the array stack 70. The array stack 70 is now sliced to generate sliced array 71 having two sets of parallel facets within the same thickness of the lightguide. Optionally, external windows 62 can be added to generate the completed single section lightguide 72 (single section lightguide 40 of FIG. 9). The angles of each slicing and angles of each stacking can be the same or different from each other, and are determined by the requirements of the final lightguide 16.

Figure 12A:
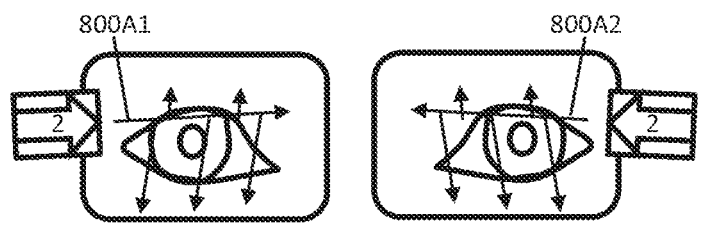
FIG. 12A, the illumination is from sides.

Referring to FIGS. 12A to 12E, there are shown various exemplary illumination architectures using the projectors 2 to illuminate an implementation of the lightguide 16. In FIG. 12A the illumination is from sides. The illumination propagation shown by the arrows 800A1 and 800A2 shows most of the expansion downward while some of the expansion is upward caused by cross reverse coupling from 6L back to 4R (refer back to FIG. 6).

Figure 12B:
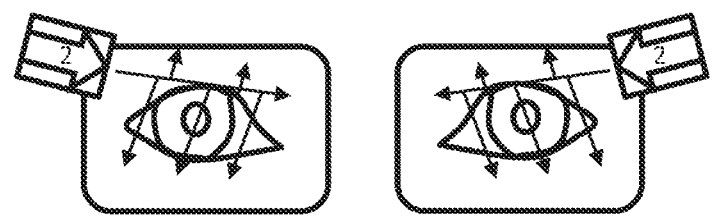
FIG. 12B, shows illumination from upper sides, this configuration reduces obscuration of side peripheral vision.

FIG. 12B shows illumination from upper sides, this configuration reduces obscuration of side peripheral vision.

Figure 12C:
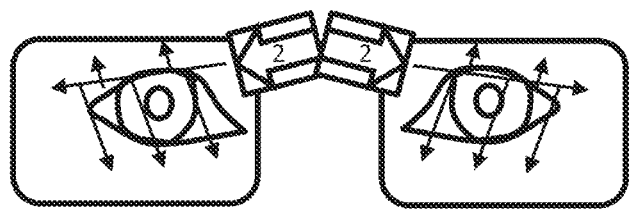
FIG. 12C shows illumination from center (between two lightguides) where the projector's hardware (right and left) can be combined to reduce size and weight.

FIG. 12C shows illumination from center (between two lightguides) where the projector's hardware (right and left) can be combined to reduce size and weight.

Figure 12D:
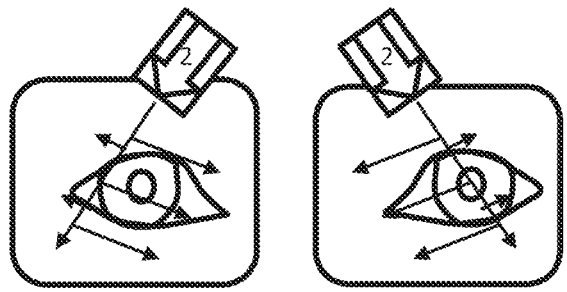
FIG. 12D shows top illumination that enables almost complete peripheral unobscured vision.

FIG. 12D shows top illumination that enables almost complete peripheral unobscured vision.

Figure 12E:
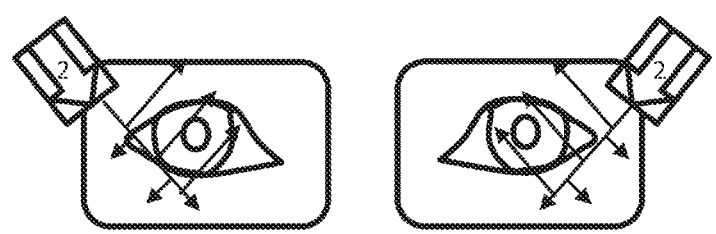
FIG. 12E shows illumination at an angle below eye orientation.

FIG. 12E shows illumination at an angle below eye orientation. This way, the image projector is located conveniently outside observer peripheral field of view.

Figure 13:
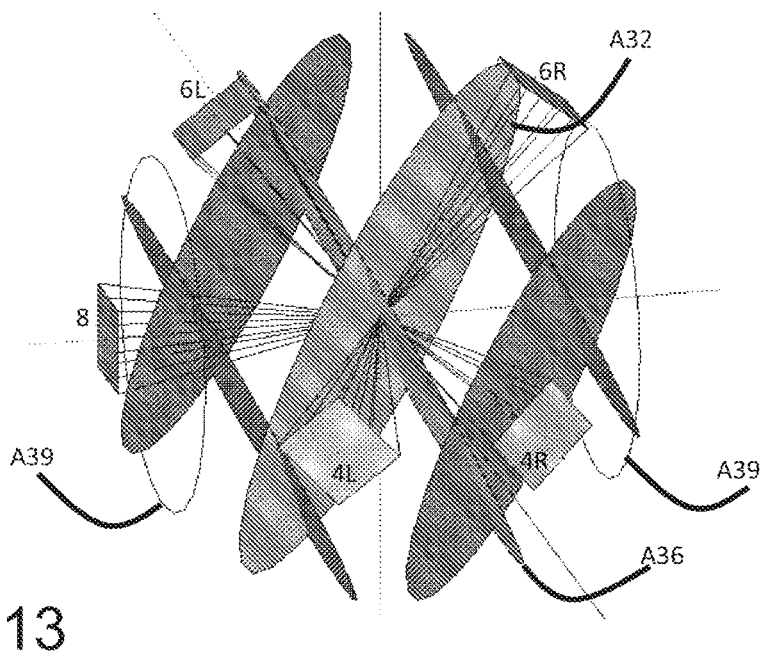
FIG. 13, there is shown a variation on the above-described architectures.

Referring to FIG. 13, there is shown a variation on the above-described architectures. Variations include different angles of the facets and images. Compare the current figure as a variation of FIG. 8. In the current figure, the angle A32 of the first set of facets 32 is such that angle A32 is on the opposite side of the angles of image 6R, thereby enabling larger images to be transmitted. The circles A39 describe the internal reflection angles of the two external faces where an image projected within these circles will couple out of the lightguide. For example, the image 8 images outside the circles and will be reflected within the lightguide as a conjugate image. where a conjugate of an image is the image reflected from an external face of the lightguide. Repeated reflections from external faces along the lightguide generate two images that are conjugates of each other.

Figure 14A:
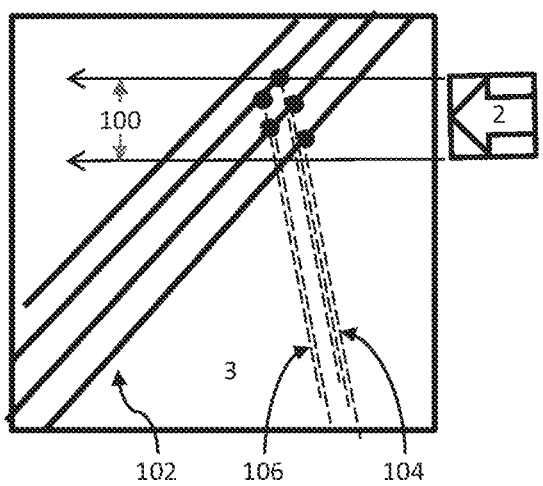
FIG. 14A and FIG. 14B, there are shown schematic sketches of the arrangement of the lightguide using the architectures of FIG. 13.
Figure 14B:
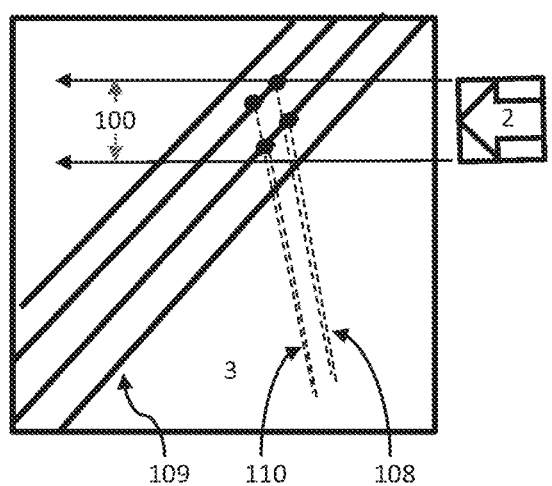

Referring to FIG. 14A and FIG. 14B, there are shown schematic sketches of the arrangement of the lightguide using the architectures of FIG. 13. In FIG. 14A, the projector 2 injects the light image into the lightguide 16. The width of the injected light is determined by the projector aperture. The two arrows show the width of the projected light beams 100 (4L and/or 4R in FIG. 13) for a specific point in the field of view (i.e., a specific direction). Preferably, this description refers to the center field of the projected image. The facets 102 (represented as orientation A32 in FIG. 13) reflect the light onto vertical directions 104 and 106. Vertical reflection 104 and vertical reflection 106 have the same direction (6R and/or 6L in FIG. 13), but different locations along the beam 100. It is apparent that the beams of the vertical reflection 104 are reflected by three of the facets 102, while the beams of the vertical reflection 106 are reflected by only two of the facets 102. Consequently, the reflected image will not have uniform intensity distribution.

In FIG. 14B, the facets 109 are arranged so that along the reflected directions (reflected direction 108 and reflected direction 110) there will be a constant number of reflections (in this case two) from the injected beam 100. The number of facets in the facets 109 that are configured for reflecting can be one, two, or more facets. The geometrical criteria for achieving a given number of facets contributing to a reflected ray are defined by the facet spacing, the angle of the facets relative to the projected image ray, and the width of the aperture, using simple trigonometry.

The second set of facets 36 of the second section 12 (refer back to FIG. 3, and angle A36 in FIG. 13) are preferably overlapping, in order to improve image uniformity.

Figure 15:
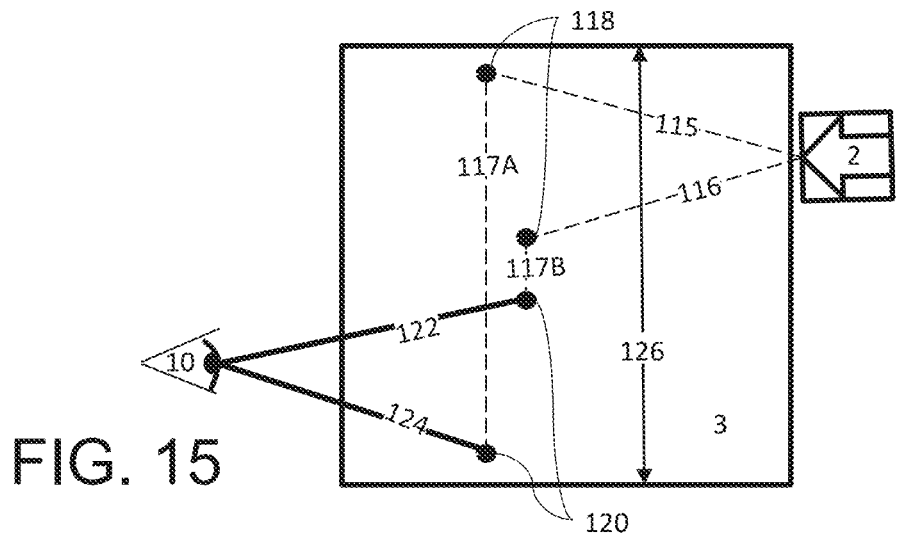
FIG. 15, there is shown a schematic sketch of propagation of light within the lightguide.

Referring to FIG. 15, there is shown a schematic sketch of propagation of light within the lightguide 16. The required size of the combined lightguide is determined by the direction of propagation of the light within the lightguide and in free space toward the eye of the observer. In the current figure, the guided propagation is depicted as dashed lines and the free space propagation as solid lines. The two propagations are not within the same plane but are shown in the current figure schematically in the same plane for clarity. Angle change by refraction is also not depicted for clarity.

The projector 2 injects an image having a field width (different angles of rays). The edges of the width of this field are represented by rays 115 and 116 (the size of 4R in FIG. 13). The rays 115 and 116 are reflected at points 118 by the first facets 32 (angle A32 in FIG. 13) to rays 117A and 117B in a different direction (down in the current figure, 6L in FIG. 13).

The two rays 117A and 117B propagate different lengths in the new direction before being reflected at points 120 by the second facets 36 (angle A36 in FIG. 13) to directions 122 (originated by 116) and 124 (originated by 115) onto the observer eye 10.

It is apparent that a height 126 of lightguide 16 cannot be smaller than the expansion of 115 with 116 and 122 with 124.

In the current configuration, the second facets 36 for the out coupling (angle A36 in FIG. 13) will start only at the upper of points 120 (as drawn on the page of the current figure). The second facets 36 are not needed above the upper of points 120, since the observer (the observer's eye 10) will not see the entire projected field.

Figure 16A:
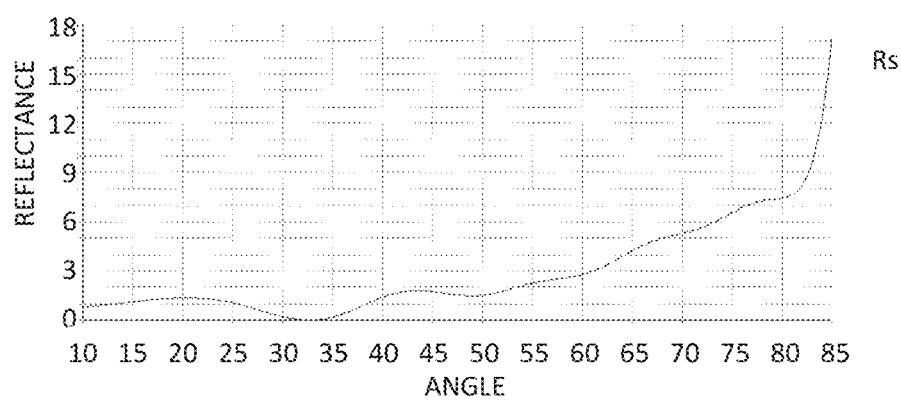
FIG. 16A is a graph of a reflectivity (reflecting profile) of a facet coating designed to reflect high angle incidence light beams.
Figure 16B:
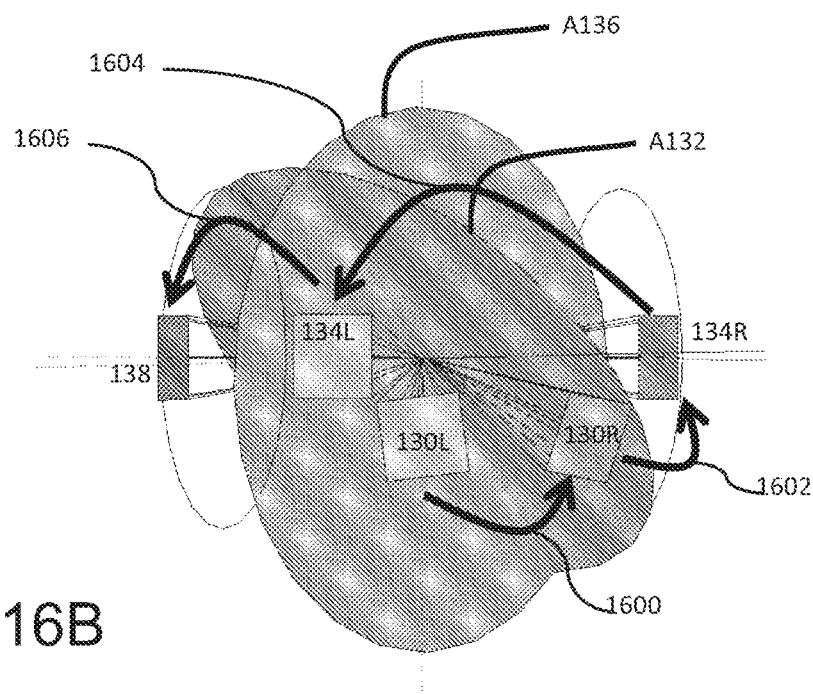
FIG. 16B shows the angular architecture of an example of the current approach.
Figure 17:
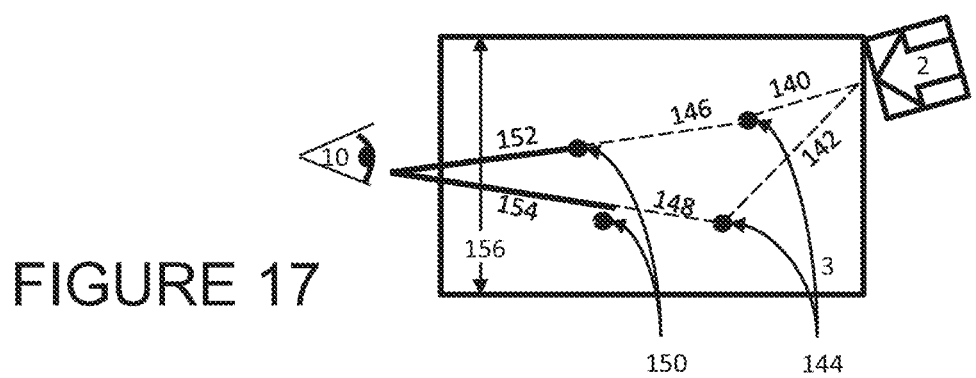
FIG. 17 shows a schematic sketch of the light propagation of the inverted image.

Referring to FIG. 16A, FIG. 16B, and FIG. 17, there is shown an approach which allows further reduction of the height of the lightguide, as compared to the above-described implementations.

FIG. 16A is a graph of a reflectivity (reflecting profile) of a facet coating designed to reflect high angle incidence light beams (in comparison to the reflectivities shown in FIG. 4). This reflecting profile is used to reverse the propagation angle of the light-beam as the propagating light is coupled out of the lightguide.

FIG. 16B shows the angular architecture of an example of the current approach. The image is injected as 130L, coupled 1600 by external face to 130R, then the facets angle A132 (of a set of facets A132, described below), having the coating of FIG. 16A couple 1602 the image to 134R. Then the external face reflects 1604 the propagating light as image 134L that is reflected 1606 by similar coating on facets angle A136 (of a set of facets 136, described below) out of the lightguide to the observer as inverted image 138. It is apparent that the lower part of the image 130L and 130R becomes the upper part of the inverted image 138, i.e., that the image is inverted.

FIG. 17 shows a schematic sketch of the light propagation of the inverted image 138. The projector 2 injects an image having a field of view bounded by rays 140 and 142 (angles 130L and/or 130R). The reflection at points 144 is by the set of facets 132 onto respective rays 146 and 148 (images 134L and/or 134R). Reflection points 150 represent the reflection by the set of facets 136 onto respective rays 152 and 154. It is apparent that the vertical direction of rays 152 and 154 is opposite to that the direction of rays 140 and 142. Consequently, the total vertical height 156 of the lightguide is smaller, as compared to the height 126 of FIG. 15.

Figure 18A:
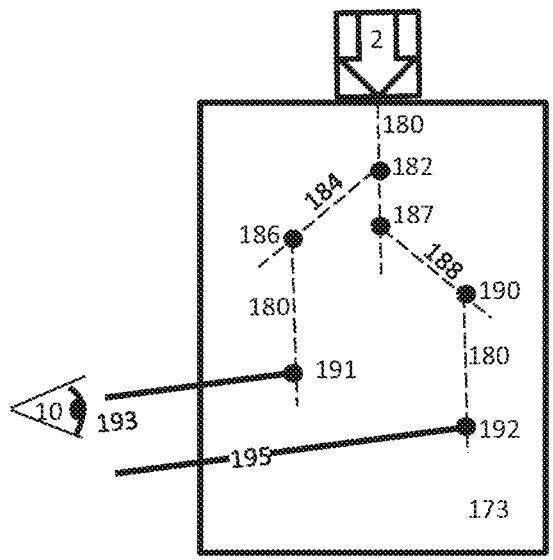
FIG. 18A is a schematic sketch of the directions of reflections as light rays propagate in lightguide 173.
Figure 18B:
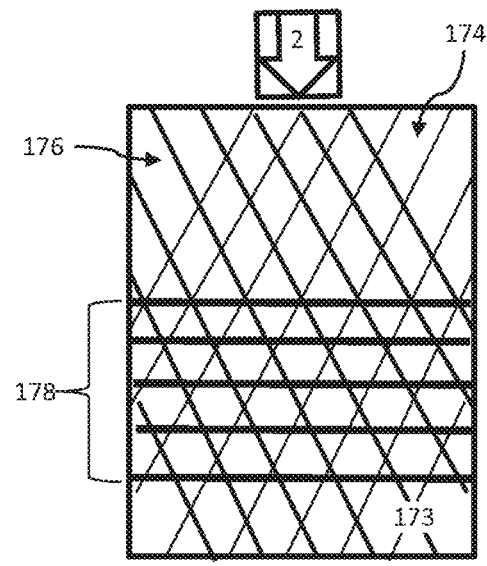
FIG. 18B is a schematic sketch of a front view of the combined lightguide 173 where three facet sections are combined.
Figure 18C:
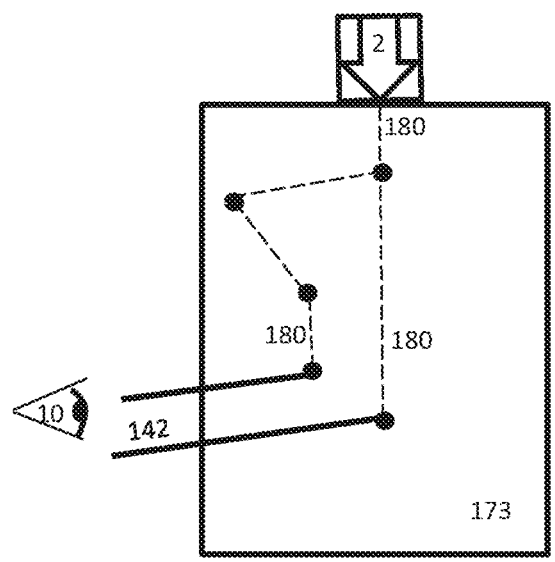
FIG. 18C is a schematic sketch of the directions of reflections as light rays propagate in lightguide 173 in another configuration of three facet sections.

Referring to FIG. 18A, FIG. 18B, and FIG. 18C, there is shown another embodiment where three sets of facets are combined to generate the lightguide 16. FIG. 18A is a schematic sketch of the directions of reflections as light rays propagate in lightguide 173. FIG. 18B is a schematic sketch of a front view of the combined lightguide 173 where three facet sections are combined. A set of facets 174 have a predefined orientation that is different from facets 176 and different from out-coupling facets 178. Projector 2 injects ray 180 into the lightguide 173. At point 182 set of facets 174 partially reflects the ray 180 to direction 184. Note, all points represent processes (via corresponding sets of facets) that are distributed across the lightguide. At some point 186, the propagating ray 184 is reflected by one of the set of facets 174 to the direction of the original ray 180. At point 191, the ray is out-coupled by the set of facets 178 as ray 193 toward the observer's eye 10. Another path of expansion is generated by facets 176. The ray from the projector 2 is reflected at point 187 by the set of facets 176 to direction 188. At some point 190, the ray 188 is back reflected to the direction 180 and at point 192 is out-coupled by the set of facets 178 as ray 195 toward the observer's eye 10.

FIG. 18C is a schematic sketch of the directions of reflections as light rays propagate in lightguide 173 in another configuration of three facet sections. The current figure is another configuration for combining three facet sections into a single lightguide to generate aperture expansion.

Figure 19A:
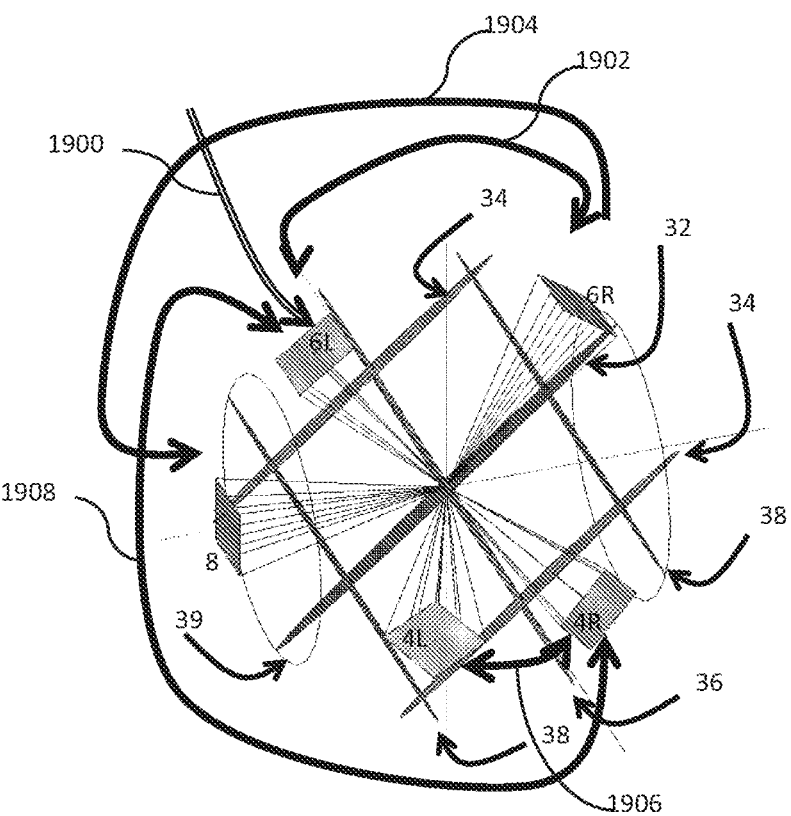
FIG. 19A, there is shown an angular diagram of an alternative direction of injecting light into the lightguide.

Referring to FIG. 19A, there is shown an angular diagram of an alternative direction of injecting light into the lightguide. In general, injecting the input image light rays at any of the coupled propagating images to achieve aperture expansion is possible. For example, the angular diagram of FIG. 8 can be modified in the current figure to inject 1900 an image illumination at 6L or 6R (where the images reflect 1902 as conjugate images). The light also reflects back and forth 1908 to 4L that is conjugate 1906 to 4R. These images propagate in different direction (thereby expanding the ray distribution in the lightguide) before returning 1908 to the original direction, and finally couple out 1904 to 8 as described in the current figure.

Figure 19B:
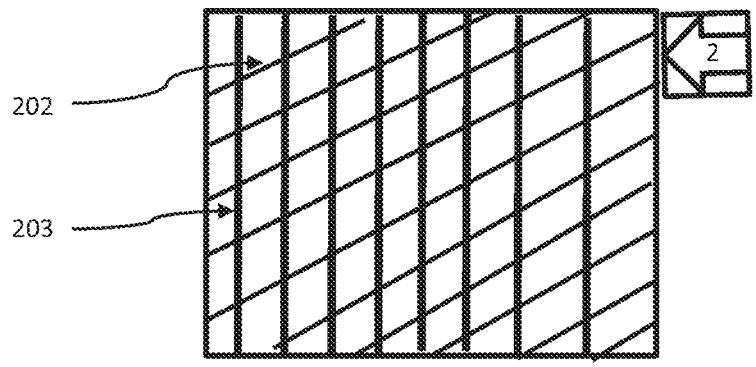
FIG. 19B, there is shown a schematic diagram of a lightguide using the angular diagram of FIG. 19A.

Referring to FIG. 19B, there is shown a schematic diagram of a lightguide using the angular diagram of FIG. 19A. The image projector 2 inputs an image to a combination of diagonal facets 202 (drawn in the current figure diagonally, functioning similar to the first set of facets 32) and out coupling facets 203 (drawn in the current figure vertically, functioning similar to the second set of facets 36).

Figure 19C:
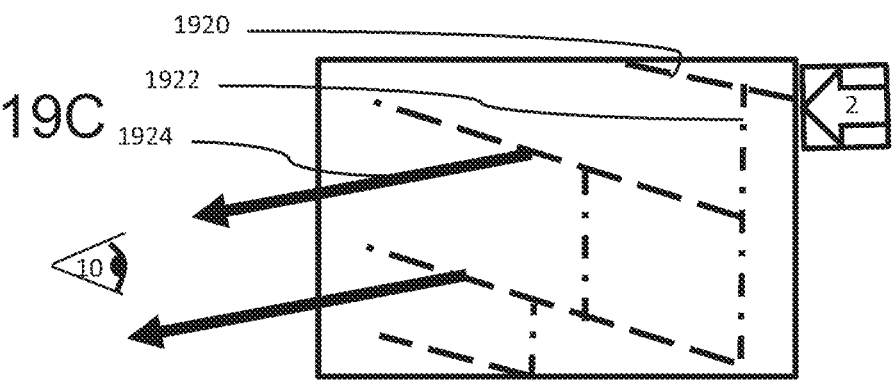
FIG. 19C, there is shown a ray propagation diagram in the current lightguide.

Referring to FIG. 19C, there is shown a ray propagation diagram in the current lightguide. In the current figure, dashed lines 1920 represent the injected ray (equivalent to 6R and 6L) from the image projector 2. The dot-dashed lines 1922 represent rays as they propagate sideways to expand the aperture (equivalent to 4R and 4L). The solid arrows 1924 represent the out-coupled ray (equivalent to 8). Note, using the current configuration, the image injection into the lightguide as images 6R or 6L is at steeper angle (apparent as these images angle relative to the internal reflection plane A39) relative to images 4R and 4L. Therefore, a smaller projector aperture is sufficient to achieve filling of the thickness dimension of the lightguide.

Figure 20:
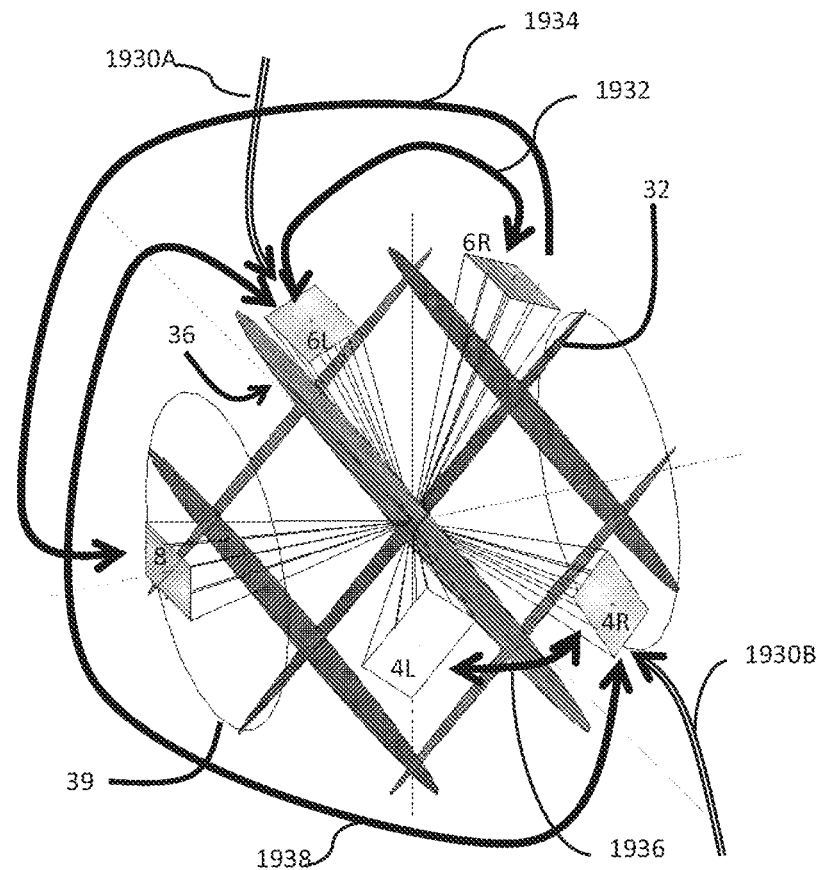
FIG. 20, there is shown an angular diagram of an alternative embodiment with facets on the other side of the image.

Referring to FIG. 20, there is shown an angular diagram of an alternative embodiment with facets on the other side of the image. In the current diagram, the second set of facets 36 are on the other side of the image 6L (i.e. both 6L and 6R are on same side relative to the second set of facets 36). The double lines (1930A, 1930B) are alternatives for coupling in the image into the lightguide. The image coupled in as 6L, 6R, 4L or 4R. Similar to previous embodiments, the images 4R and 4L are conjugate 1936 images that couple 1938 back and forth to 6L that conjugates 1932 with 6R. The image 6R is also reflected 1934 out as image 8 towards the observer.

In alternative embodiments, various configurations can be used for facet reflection, including:
  The image and image conjugate on different sides of the facet (FIG. 13)
  The image and image conjugate on the same side of the facet (FIG. 20)
In alternative embodiments, various coatings can be used, including:
  Reflecting of image angularly near the facet angle (FIG. 16A)
  Reflecting of image further from facet angle (FIG. 4)
In alternative embodiments, various image injection into the lightguide can be used, including:
  Direction to be directly output coupled (6R, 6L in FIG. 20)
  Direction to be changed before output coupling (4L, 4R FIG. 19D)

Figure 21:
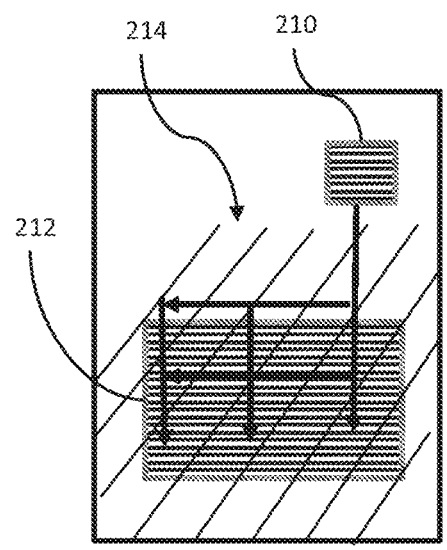
FIG. 21, there is shown a hybrid system where refractive facets are combined with diffractive gratings.

Referring to FIG. 21, there is shown a hybrid system where refractive facets are combined with diffractive gratings to achieve the functionality of aperture expansion much the same way as described with reference to FIG. 1 and FIG. 2.

Application of diffractive gratings requires the use of at least two gratings having opposite optical power, so that chromatic dispersion will be canceled. In the embodiment of the current figure, a diffractive pattern 210 is used to couple the input light into the lightguide, while diffractive pattern 212 is used to coupling the light out of the lightguide. The lateral aperture expansion is achieved by overlapping diagonal facets 214 that couple the propagating light back and forth laterally, without introducing a chromatic aberration. Here again, the set of overlapping diagonal facets 214 are deployed to redirect a first guided mode (internally reflected at the major substrate surfaces) to a second guided mode (internally reflected at the major substrate surfaces).

Referring to FIGS. 22A-C, there are shown various embodiments for mixing rays during propagation. Mixing of the propagating rays within the lightguide 16 can be achieved by a variety of implementations. For example, by introducing partial reflection between the first set of facets 32 in the first section 14 and the second set of facets 36 in the second section 12.

Referring to FIG. 22A, there is shown sections separated by a partially reflecting coating. The first section 14 and the second section 12 are separated at an interface 250 by a partially reflecting coating. The input optical arrangement 20 provides the input beam 4 to the lightguide 16. The interface 250, and thus the partial reflecting coating, is parallel to the external faces (the first external face 22 and the second external face 24). This implementation will maintain all rays in the propagating light rays 5 (shown as dark arrows) original directions, despite multiple splitting and reflections of the propagating rays 5. In the current figure, for clarity, splitting of only one ray is depicted. One skilled in the art will realize from the current description that multiple splitting occurs, further improving uniformity of the output image.

Alternatively, the first section 14 and the second section 12 can be made of different materials (for example, glass and plastic, or different types of glass), thereby causing Fresnel reflections at the interface 250. The interface 250 can alternatively and/or additionally generate polarization rotation (dielectric variation at interface will cause this affect) further improving uniformity of the output image.

Referring to FIG. 22B, there is shown an alternative, smaller, optical arrangement 20B. System cost can be reduced by reducing the size of the image projector (the FIG. 22A optical arrangement 20). However, uniform image illumination requires that the image projector illuminate all of the entrance of the lightguide 16. In the current figure, the increased coupling caused by the reflecting interface 250 enables a smaller image projector 252 for a smaller optical arrangement 20B, as compared to the optical arrangement 20.

Referring to FIG. 22C, there is shown an alternative embodiment with a partial reflector. Maintaining parallelism of the plane of the interface 250 with the external faces (the first external face 22 and the second external face 24), can be technically problematic. In the current figure, a small parallel reflector 254 is used. The small parallel reflector 254 is implemented as the interface 250 at only a portion of the interface between the first section 14 and the second section 12. This smaller reflector 254 generates splitting of the input coupling rays (the input beam 4) so all the lightguide 16 is illuminated uniformly. Preferably, the small reflector 254 (interface 250) reflectivity is gradually diminishing along the lightguide (from the proximal to distal ends) thereby improving uniformity of the output image. This gradual diminishing of upper section (first section 14) reflectivity can be used to compensate for facets increased reflectivity (facets further away from the projector have higher reflectivity to maintain constant image power), thereby generating appearance of constant transparency across the lightguide.

Referring to FIG. 23, there is shown a schematic sketch of propagation of light within a lightguide with non-optimal expansion. Transverse aperture expansion can be performed by generating non-optimal rays (also referred as 'ghosts') and coupling back from these ghosts. However, this process is less efficient and can cause image degradation, as compared to the optimal ray propagation techniques described above. This process is generated by using crossed facets (as in FIG. 2) but without the coating optimization (as in FIG. 8). Consequently, 4L and 4R are also reflected by the second set of facets 36, thus generating undesired images. However, with proper selection of facet angles (iterative design in angular space as in FIG. 8) these ghosts will be outside the field of interest of the observer.

The current figure shows how these 'ghosts' are used to expand the image in another, transverse direction. The projector 2 injects rays in direction 260. After reflection by the first set of facets 32 of the first section 14, the propagating light is diverted to direction 262. After reflection by the second set of facets 36 of the second section 12, the propagating light is diverted out of the lightguide in direction 264. The previous expansion was in one transverse direction. The input rays in direction 260 can also be reflected by the facets of the second section 12 to direction 266 that is guided, but in an opposite direction from direction 264. A secondary interaction by the second set of facets 36 of the second section 12 reflect the propagating rays from direction 266 back to the original direction 260 but shifted latterly. Similar to the above description of direction 260, the propagating ray 260 is reflected by the first set of facets 32 to direction 262 and by second set of facets 36 out of the lightguide in direction 264.

Figure 24A:
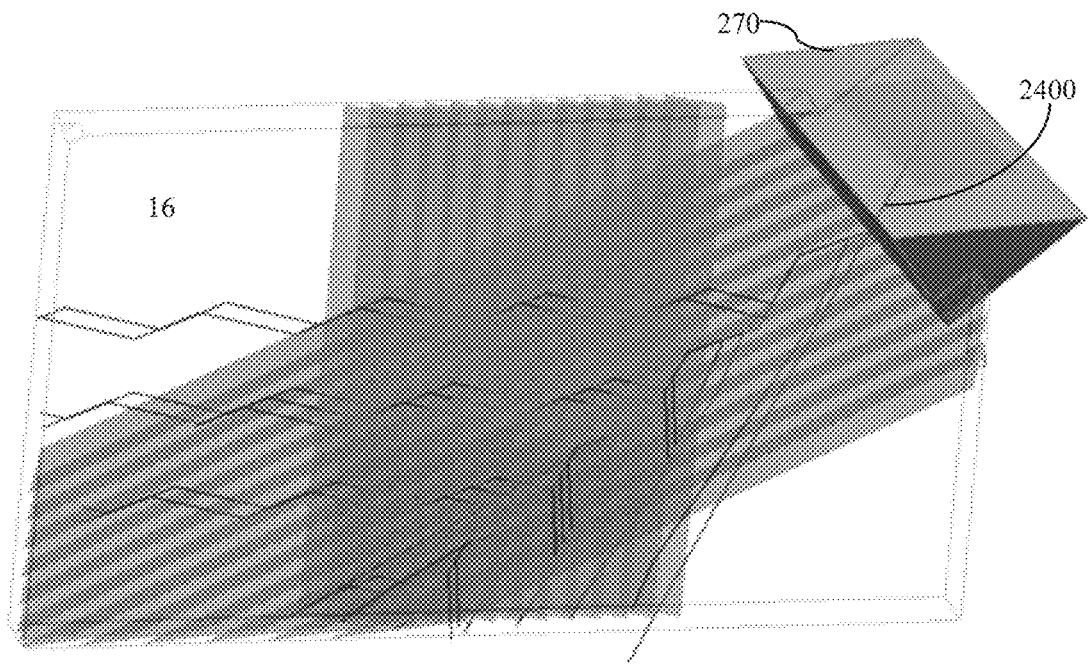
FIG. 24A, there is shown an example of two similar cross sections having a coupling prism used to couple the input beam into the lightguide.

Referring to FIG. 24A, there is shown an example of two similar cross sections having a coupling prism 270 used to couple the input beam 4 into the lightguide 16. A single chief-ray 2400 (center of field and center of aperture) is shown as the ray is split by the sections facets. This coupling into the lightguide can be performed in various ways.

Figure 24B:
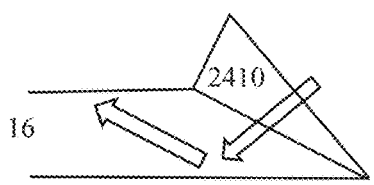
FIG. 24B shows a configuration where the lightguide was polished at an angle and a prism added on top of the polished angle.
Figure 24C:
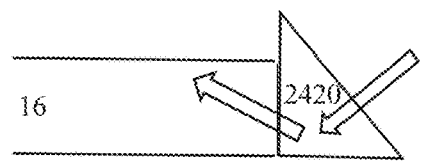
FIG. 24C shows a configuration with an addition of a prism to the vertical end of the lightguide.

Referring to FIG. 24B and FIG. 24C, there are shown schematic sketches of cross-sections of coupling arrangements. The cross-section are along the plane of the chief-ray 2400 shown in FIG. 24A.

FIG. 24B shows a configuration where the lightguide 16 was polished at an angle and a prism 2410 added on top of the polished angle. This configuration enables smooth reflection from the bottom (as shown in the figure) of the lightguide 16.

FIG. 24C shows a configuration with an addition of a prism 2420 to the vertical end of the lightguide 16. This configuration enables a longer coupling section (extending from the lightguide 16 rectangular shape. This configuration also enables using a different refractive index for the prism 2420 and for the lightguide 16.

Figure 24D:
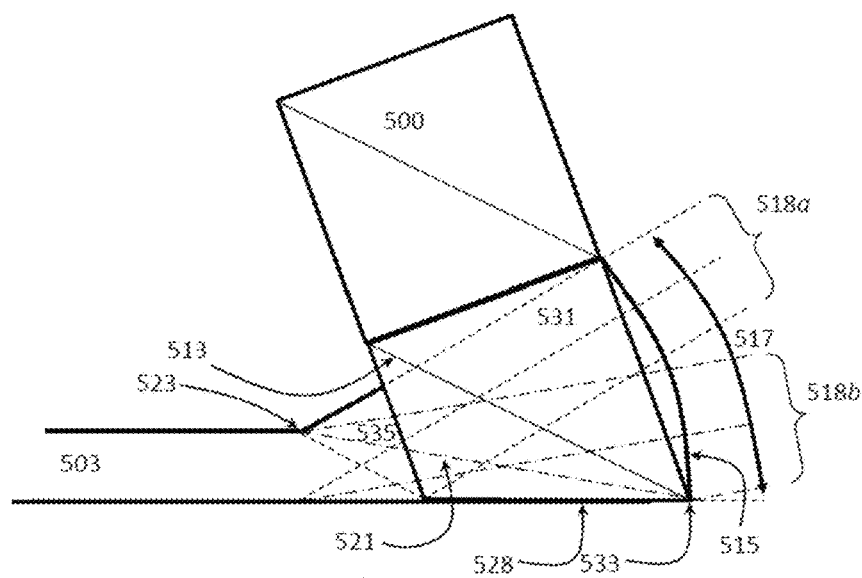
FIG. 24D shows a combination of a prism with an image generator based on polarizing beam splitter.

FIG. 24D shows a combination of a prism with an image generator based on polarizing beam splitter. This combination saves volume and space.

The various orientations of the facets within the two sections will cause polarization variation of the rays within the lightguide 16. Therefore, introducing un-polarized light can be preferred. The un-polarized light can originate from an inherently un-polarized projector (for example based on a TI DLP, Texas Instruments Digital Light Processing) or after placing a depolarizer in front of a polarized projector (crystal Quartz window).

Referring to FIG. 25, there is shown a safety binder between sections. In case of brakeage of the lightguide 16 (the glass or plastic of the lightguide) the broken fragments should be attached together and maintain structural integrity, in order to prevent injury to the observer. This maintaining integrity of the lightguide can be achieved by various techniques, such as introducing an appropriate glue or plastic foil between the two sections (between the first section 14 and the second section 12), shown in the current figure as an intermediate layer 280. Consequently, in case of structural damage to one or more of the sections, the resulting fragments will remain attached to the lightguide 16, and not scatter, thereby reducing possibility of injury to the user. The optical properties of intermediate layer 280 can vary, including, but not limited to the properties discussed above with respect to the interface 250. The intermediate layer 280 can be index matched to the index of the sections, or the index of the intermediate layer 280 can differ from the index of the sections to enable reflections as described regarding FIG. 22.

Referring to FIG. 26A and FIG. 26B, there are shown respective side and front views of a 2D lightguide feeding a two-section lightguide 16. Lateral aperture expansion can be performed by a 1D lightguide on top of another 1D lightguide, by a 2D lightguide on top of a 1D lightguide or by the overlapping (few-axis) 1D lightguide described above. Combining these techniques can obtain uniform image intensity generated lightguide and image projector having minimal size.

FIG. 26A shows a side view of a 2D lightguide 310 that expands the aperture latterly, followed by the lightguide 320 (a version of the overlapping waveguide 16). As shown in the current figure, lightguide 320 is a two axis lightguide that expand the aperture vertically, and as shown in FIG. 26B expands the aperture latterly.

Lateral aperture expansion by a 2D lightguide can be performed by various alternatives as described in PCT/IL2017/051028 filed 12 Sep. 2017 and PCT/IL2005/000637 (U.S. Pat. No. 7,643,214), both to Lumus Ltd. The two axis lightguide can have any of the above configurations. Preferably further averaging and mixing is performed by including overlapping facets as described in PCT/IL2018/050025 to Lumus Ltd., filed 8 Jan. 2018.

Referring to FIG. 27A and FIG. 27B, there are shown respective side and front views of a 1D lightguide feeding a two-section lightguide 16. FIG. 27A shows a side view of a 1D lightguide 410 that expands the aperture latterly, followed by the lightguide 320.

A near eye display lightguide transmits light of a "virtual" image from the projector 2 to the observer eye 10 while multiplying the projected aperture. The transmission through the lightguide 16 includes reflections by embedded reflectors (facets) or diffraction by gratings.

The lightguide 16 is transparent to the "world" and should preferably not introduce any reflections of the world toward the observer's eye 10.

Many lightguide configurations do introduce some reflections from high angles toward the eye 10. Coating of the facets (or diffraction efficient of gratings) can be optimized to reduce the efficiency of reflections at such high angles. However high intensity light sources, such as a lamp (in a dark environment) or the sun, can reflect substantial light intensity toward the observer.

Referring to FIG. 28 there is shown an angular diagram of an undesired image overlapping the virtual image. The current figure is based on FIG. 13, however in the current figure, only one point in the field is represented. A light source from outside the system is coupled into the lightguide and generates an undesired image overlapping the virtual image.

The external source is marked as 8Is (for example the sun at high angle above the observer). The external source 8Is is transmitted into the lightguide 16 to be reflected by the second set of facets 36 onto angle 4Rs (overlapping 4R in FIG. 13) from this point the undesired image follows the image path: 4Rs, 6Ls, 6Rs and to the observer 8s.

It is apparent that 4Rs is guided therefore the image will be transmitted to the observer. However, at different angles of 8Is the external source will be coupled to 4Rs that is not guided by internal reflection therefore no undesired image will be generated.

Clutter light can also couple into the lightguide through image 4Rs when this image is outside TIR (within one of the circles). This (clutter) light penetrates from the other side of the lightguide (the observer side). In order to prevent the clutter light 8Is or 4Rs from becoming guided, a shade can be placed on top of the lightguide as shown in FIG. 29A.

Referring to FIG. 29A there is shown a shade to prevent high angle light from reaching the lightguide. A shade 1009 is introduced preferably blocking the front and back (of the lightguide 16) high angle clutter light 2900. Lower angle incident light 1007A will not illuminate 1007B the eye-box, and therefore will not be visible.

Referring to FIG. 29B there is shown an angular sensitive coating to prevent high angle light from reaching the lightguide. An angularly sensitive coating 1011 is introduced. This coating 1011 reflects high angle (relative to vertex) incidence light rays 2900 while transmit lower angle light 1007A as depicted.

Referring to FIG. 30, there is shown an alternative combination of sections. In the current figure, the two sections (the first section 14 and the second section 12) are combined into a single 1D lightguide 1020. This lightguide 1020 has the two sections adjacent using a different edge, compared to the adjacent edges of the overlapping lightguide 16 shown in FIG. 2. The sections of lightguide 1020 are combined as a continuation, where propagating light that is guided (FIG. 13, the two images 4L and 4R) is reflected first by the first set of facets 32 in the first section 14 (4R by the first set of facets 32 in FIG. 13) and then by the second set of facets 36 in the second section 12 (6R by the second set of facets 36 in FIG. 13). Note that according to this implementation, the facets are not perpendicular to the lightguide faces. Therefore, only one image is reflected on the critical path toward the eye 10. For example, only 4R is reflected to 6L and not 4R to 6R simultaneously with 4L to 6L. This single critical path relaxes requirement for alignment accuracies that exist in multi-path architectures.

Figures 32A, 32B:
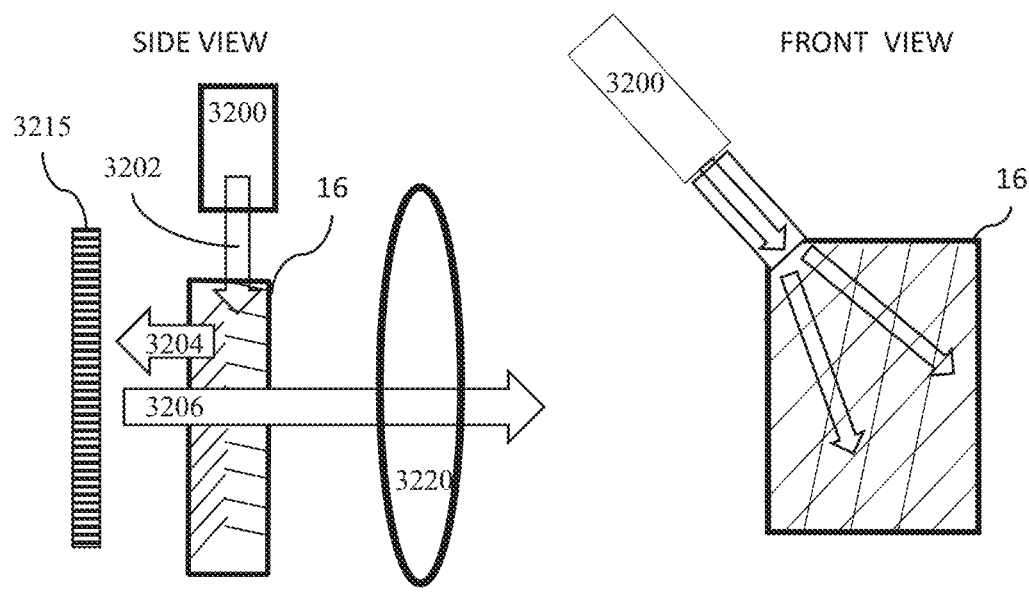
FIG. 32A, there is shown a side view schematic sketch of an exemplary illumination system.
FIG. 32B, there is shown a front view schematic sketch of an exemplary illumination system.

Referring to FIG. 32A, there is shown a side view schematic sketch of an exemplary illumination system. The lightguide 16 can be used for an illumination system providing transparent no-imaging illumination of image projectors. A light source 3200 provides input illumination that illuminates the lightguide 16. As light 3202 propagates in the lightguide 16, the light 3202 is reflected 3204 by the facets of the lightguide 16 onto an image modulator 3215. For example, the image modulator 3215 can be an LCOS. The reflected image light 3206 passes through the waveguide and is then typically imaged by optics 3220. Preferably, the facets are polarization sensitive therefore, the lightguide 16 acts as a polarization beam splitter. For clarity in the current description and figure, polarizers and polarization rotators are omitted.

Referring to FIG. 32B, there is shown a front view schematic sketch of an exemplary illumination system, showing a front view of the lightguide 16. The light source 3200 projects the light 3202 directly (or through a lightpipe) into the lightguide 16 where the crossing (overlapping) orientations of the facets cause lateral expansion of the source aperture within the lightguide 16 and projects the light out of the lightguide 16.

Note that the above-described examples, numbers used, and exemplary calculations are to assist in the description of this embodiment. Inadvertent typographical errors, mathematical errors, and/or the use of simplified calculations do not detract from the utility and basic advantages of the invention.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. An optical device comprising:
    a lightguide for guiding light corresponding to a collimated image, the lightguide comprising a first external face and a second external face parallel to the first external face, the lightguide having a first section and a second section, the first section comprising a first set of partially reflecting facets parallel to each other and disposed between the first and second external faces, and the second section comprising a second set of partially reflecting facets parallel to each other and disposed between the first and second external faces;
    the first section reflects the guided light propagating in a first guided direction in the lightguide to propagate in a second guided direction in the lightguide, the second section reflects the guided light propagating in the second guided direction in the lightguide to out of the lightguide;
    each of the facets in the first set of partially reflecting facets and in the second set of partially reflecting facets reflects light at incidence angles between 55 and 85 degrees from the normal to the surface of the facet; and
    in the first set of partially reflecting facets the respective partially reflecting facets are at a first angle which is oblique relative to the first and second external faces, and in the second set of partially reflecting facets the respective partially reflecting facets are at a second angle which is oblique relative to the first and second external faces;
    wherein the surface of each of the facets in the first set and the second set has a facet coating providing angularly dependent reflectivity such that the image reflectivity at incidence angles between 55 and 85 degrees from the normal to the surface increases as the angle of incidence increases from 55 to 85 degrees from the normal to the surface.

2. The optical device of claim 1, wherein for each of the facets in the first set and the second set coating of the facet is such that image reflectivity at incidence angles between 10 to 55 degrees from a normal to the surface of the facet is lower than image reflectivity at incidence angles between 55 and 85 degrees from the normal to the surface.

3. The optical device of claim 1, wherein the second section reflects the guided light for coupling the light out of the lightguide as an output image that corresponds to the collimated image inverted such that an upper part of the output image corresponds to a lower part of the collimated image.

4. The optical device of claim 1, wherein the partially reflecting facets in the second set are nonparallel to the partially reflecting facets in the first set.

5. The optical device of claim 1, wherein the partially reflecting facets of the first section overlap the partially reflecting facets of the second section along:
   (a) a width dimension of the lightguide, or
   (b) along a height dimension of the lightguide.

6. An optical device comprising:
   a lightguide for guiding light corresponding to a collimated image along a light path, the lightguide having a first section and a second section, each of the first section and the second section comprising:
      a first external face and a second external face, the first and second external faces parallel to each other,
      a third external face and a fourth external face, the third and fourth external faces non-parallel to the first and second external faces, a distance between the third and fourth external faces being larger than a distance between the first and second external faces, and
      a set of partially reflecting facets parallel to each other and disposed between the first and second external faces;
   the first section disposed prior to the second section in the light path;
   in each of the sets of facets, the respective partially reflecting facets are:
      at an oblique angle relative to the first and second external faces, and
      each of the partially reflecting facets lying in a plane;
   the set of partially reflecting facets of the first section having a first set of lines of intersection between the planes of the set of partially reflecting facets of the first section and a plane of the first external face of the first section;
   the set of partially reflecting facets of the second section having a second set of lines of intersection between the planes of the set of partially reflecting facets of the second section and a plane of the first external face of the second section;
   the first and second sets of lines being non-parallel; and
   each of the facets in the set of partially reflecting facets of the first section and the second section reflects light at incidence angles between 55 and 85 degrees from the normal to the surface of the facet;
   wherein the surface of each of the facets in the set of partially reflecting facets of the first section and the second section has a facet coating providing angularly dependent reflectivity such that the image reflectivity at incidence angles between 55 and 85 degrees from the normal to the surface increases as the angle of incidence increases from 55 to 85 degrees from the normal to the surface.

7. The optical device of claim 6, wherein for each of the facets in the set of partially reflecting facets of the first section and the second section coating of the facet is such that image reflectivity at incidence angles between 10 to 55 degrees from a normal to the surface of the facet is lower than image reflectivity at incidence angles between 55 and 85 degrees from the normal to the surface.

8. The optical device of claim 6, wherein the second section reflects the guided light for coupling the light out of the lightguide as an output image that corresponds to the collimated image inverted such that an upper part of the output image corresponds to a lower part of the collimated image.

9. The optical device of claim 6, wherein an angle of the partially reflecting facets of the first section relative to its respective first external face is different from an angle of the partially reflecting facets of the second section relative to its respective first external face.

10. The optical device of claim 6, wherein:
   (a) the second external face of the first section is glued to the first external face of the second section, or
   (b) the fourth external face of the first section is glued to the third external face of the second section.

11. An optical device comprising:
   a lightguide for guiding light corresponding to a collimated image, the lightguide having a first section and a second section, each of the first section and the second section comprising:
      a first external face and a second external face, and
      a set of partially reflecting facets parallel to each other and disposed between the first and second external faces;
   wherein the first section and the second section are combined as a continuation, wherein the light is reflected first by the set of partially reflecting facets of the first section and then by the set of partially reflecting facets of the second section;
   in each of the sets of facets, the respective partially reflecting facets are:
      at an oblique angle relative to the respective first and second external faces,
      each of the partially reflecting facets lying in a respective plane, and
   the set of partially reflecting facets of the first section having a first set of lines of intersection between the planes of the set of partially reflecting facets of the first section and a plane of the first external face of the first section;
   the set of partially reflecting facets of the second section having a second set of lines of intersection between the planes of the set of partially reflecting facets of the second section and a plane of the first external face of the second section; and
   the first and second sets of lines are non-parallel; and
   each of the facets in the set of partially reflecting facets of the first section and the second section reflects light at incidence angles between 55 and 85 degrees from the normal to the surface of the facet;
   wherein the surface of each of the facets in the set of partially reflecting facets of the first section and the second section has a facet coating providing angularly dependent reflectivity such that the image reflectivity at incidence angles between 55 and 85 degrees from the normal to the surface increases as the angle of incidence increases from 55 to 85 degrees from the normal to the surface.

12. The optical device of claim 11, wherein for each of the facets in the set of partially reflecting facets of the first section and the second section coating of the facet is such that image reflectivity at incidence angles between 10 to 55 degrees from a normal to the surface of the facet is lower than image reflectivity at incidence angles between 55 and 85 degrees from the normal to the surface.

13. The optical device of claim 11, wherein the second section reflects the guided light for coupling the light out of the lightguide as an output image that corresponds to the collimated image inverted such that an upper part of the output image corresponds to a lower part of the collimated image.

14. The optical device of claim 11, wherein the facets in the set of partially reflecting facets of the first section are not perpendicular to the first and second external surfaces of the first section and the facets in the set of facets of the second section are not perpendicular to the first and second external surfaces of the second section.

15. The optical device of claim 11, wherein the first section is configured to perform coupling-in of the light into the lightguide, the set of facets of the first section configured to reflect the light to the second section, and the set of facets of the second section is configured to couple the light out of the lightguide.

16. The optical device of claim 11, wherein an angle of the partially reflecting facets of the first section relative to its respective first external face is different from an angle of the partially reflecting facets of the second section relative to its respective first external face.

17. The optical device of claim 11, wherein the partially reflecting facets of the first section overlap the partially reflecting facets of the second section along a width dimension of the lightguide or along a height dimension of the lightguide.

\* \* \* \* \*